(12) United States Patent
Iino

(10) Patent No.: US 7,971,219 B2
(45) Date of Patent: Jun. 28, 2011

(54) DISPLAY CONTROL APPARATUS AND METHOD

(75) Inventor: Satoshi Iino, Kanagawa (JP)

(73) Assignee: Sony Corporation, Tokyo (JP)

( * ) Notice: Subject to any disclaimer, the term of this patent is extended or adjusted under 35 U.S.C. 154(b) by 1056 days.

(21) Appl. No.: 10/381,664

(22) PCT Filed: Jul. 18, 2002

(86) PCT No.: PCT/JP02/07287
§ 371 (c)(1),
(2), (4) Date: Oct. 3, 2003

(87) PCT Pub. No.: WO03/010958
PCT Pub. Date: Feb. 6, 2003

(65) Prior Publication Data
US 2005/0229211 A1 Oct. 13, 2005

(30) Foreign Application Priority Data
Jul. 25, 2001 (JP) .................................. 2001-223903

(51) Int. Cl.
*G06F 13/00* (2006.01)
(52) U.S. Cl. .................. 725/58; 725/37; 725/39; 725/55
(58) Field of Classification Search .................... 725/39, 725/58, 37, 55
See application file for complete search history.

(56) References Cited

U.S. PATENT DOCUMENTS

| | | | | |
|---|---|---|---|---|
| 5,187,589 A | * | 2/1993 | Kono et al. ...................... | 386/83 |
| 5,307,173 A | * | 4/1994 | Yuen et al. ...................... | 386/83 |
| 5,379,153 A | | 1/1995 | Ishii et al. | |
| 5,850,218 A | * | 12/1998 | LaJoie et al. .................... | 725/45 |
| 6,118,492 A | * | 9/2000 | Milnes et al. ................... | 725/52 |
| 6,169,543 B1 | * | 1/2001 | Wehmeyer ...................... | 725/47 |
| 6,177,931 B1 | * | 1/2001 | Alexander et al. .............. | 725/52 |
| 6,240,240 B1 | * | 5/2001 | Nagano et al. .................. | 386/83 |
| 6,292,624 B1 | * | 9/2001 | Saib et al. ....................... | 386/83 |
| 6,370,317 B2 | * | 4/2002 | Nagano et al. .................. | 386/83 |
| 2001/0004418 A1 | * | 6/2001 | Nagano et al. .................. | 386/83 |
| 2001/0033736 A1 | * | 10/2001 | Yap et al. ......................... | 386/46 |
| 2002/0049620 A1 | * | 4/2002 | Uchida et al. ..................... | 705/5 |

FOREIGN PATENT DOCUMENTS

EP 0 439 290 7/1991

(Continued)

*Primary Examiner* — Christopher Kelley
*Assistant Examiner* — Sahar A Baig
(74) *Attorney, Agent, or Firm* — Frommer Lawrence & Haug LLP; William S. Frommer; Thomas F. Presson

(57) ABSTRACT

The invention relates to a display control apparatus and method that make it possible to easily recognize detailed information relating to an overlap time slot in an apparatus capable of setting recording reservations for programs whose broadcast time slots overlap with each other. Program-11 that will be broadcast from 11 a.m. to 11:50 a.m. on channel-123 and program-14 that will be broadcast from 11:40 a.m. to 12:40 p.m. on channel-124 have an overlap broadcast time of 11:40 a.m. to 11:50 a.m. Of a block of program-11, a portion of the overlap time slot is given a color (hatched) meaning that an action corresponding to a set reservation will be executed in spite of the overlap in broadcast time with the other program. Of a block of program-14, a portion of the overlap time slot is given a color (dotted) meaning that an action corresponding to a set reservation will not be executed because of the overlap in broadcast time with the other program. The invention can be applied to equipment for processing TV programs such as STBs.

15 Claims, 17 Drawing Sheets

FOREIGN PATENT DOCUMENTS

| | | |
|---|---|---|
| EP | 0 705 036 | 4/1996 |
| EP | 0 836 320 | 4/1998 |
| JP | 6-60473 | 3/1994 |
| JP | 10-341381 | 12/1998 |
| JP | 2001-155393 | 6/2001 |
| JP | 2002-27337 | 1/2002 |

* cited by examiner

FIG. 12

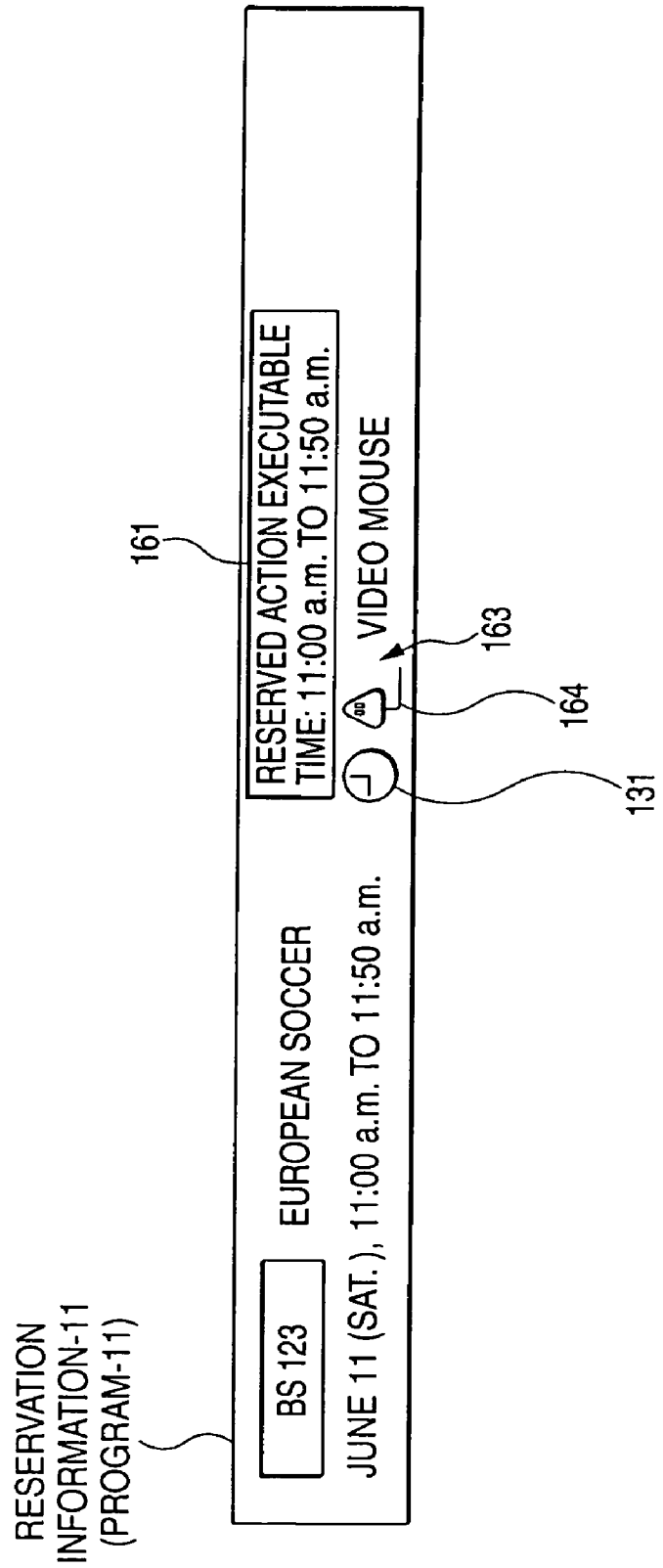

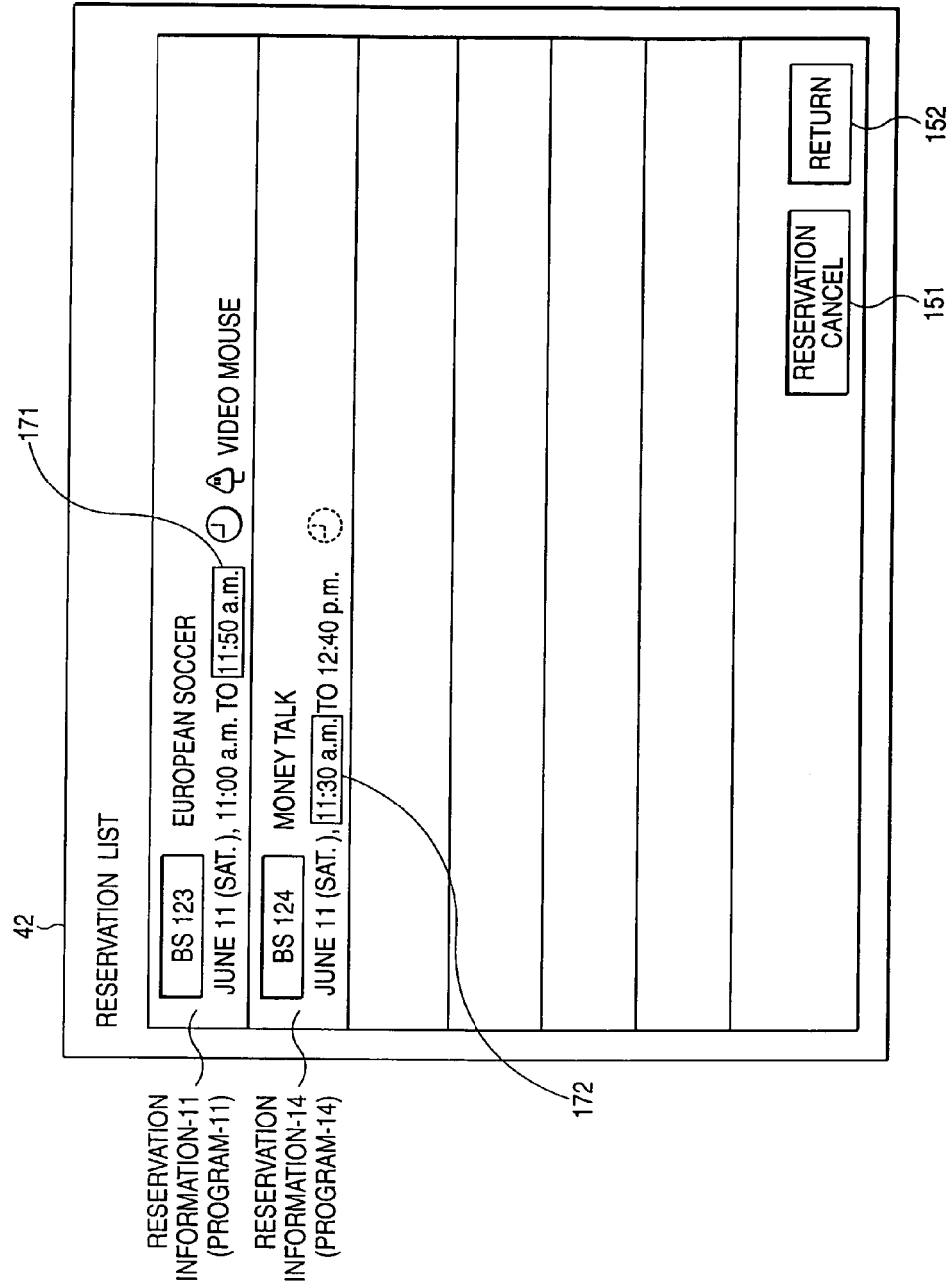

DISPLAY CONTROL APPARATUS AND METHOD

TECHNICAL FIELD

The present invention relates to a display control apparatus and method. In particular, the invention relates to a display control apparatus and method that make it possible to easily recognize detailed information relating to an overlap time slot in an apparatus capable of setting recording reservations for programs whose broadcast time slots overlap with each other.

BACKGROUND ART

What is called the EPG (electronic program guide) in which program guide data to be used for program selection are transmitted being multiplexed with program data such as video and audio and other data and are displayed on a reception-side display device is known in such a field as digital broadcast.

Using an EPG, users can not only select a program to watch but also, for example, select a program to be reserved for recording to store it in a DVCR (digital video cassette recorder), a hard disk recorder, or the like that is connected to the display device.

For example, a user can set a recording reservation by selecting a desired program from programs in a displayed EPG by manipulating a remote controller or the like and then depressing a recording reservation button.

For a program for which a recording reservation has been set, a prescribed icon or the like that informs a user of the setting of the recording reservation is displayed in the EPG.

Incidentally, there are recording devices such as DVCRs and hard disk recorders that allow setting of recording reservations for programs whose broadcast times overlap with each other. This function allows users to set, in the case where, for example, a setting to perform recording in the same time slot every day has already been made, a recording reservation for another program to be broadcast in that time slot without the need for taking care about such an existing setting.

FIG. 1 shows an EPG example that is displayed by an apparatus that allows, as mentioned above, setting of recording reservations for programs whose broadcast times overlap with each other.

In FIG. 1, the horizontal axis represents the time and the vertical axis represents channels. Although in the example of the figure programs that are broadcast on channel-127 to channel-131 are omitted, actually the titles etc. of programs to be broadcast in the time slots shown are displayed like those of channel-123 to channel-126.

As shown in the figure, for example, the broadcast times of program-1 (European Soccer) and program-3 (Money Talk) overlap with each other and the broadcast times of program-2 (World Martial Arts) and program-3 also overlap with each other. Icons indicating that recording reservations are set for these programs are displayed on the left of their program names, respectively.

In the example of FIG. 1, reservation icons 11, 12, and 13 are displayed on the left of the titles of program-1, program-2, and program-3, respectively.

By checking such reservation icons, a user can easily recognize for what programs recording reservations are set.

FIG. 2 shows an example in which recording reservations have been set by using an EPG and detailed information of those settings is displayed in list form.

In this example, detailed reservation information of program-1, program-2, and program-3 for which reservations are set in FIG. 1 is displayed as reservation information-1, reservation information-2, and reservation information-3, respectively.

Each piece of reservation information, for example, reservation information-1, is such that a program title, a channel, a broadcast date and time, etc. are displayed and a reservation icon 11 etc. are displayed on their right.

By referring to such a list display, a user can also recognize easily for what programs recording reservations are set.

However, although displaying, for example, an EPG as shown in FIG. 1 allows a user to easily recognize for what programs recording reservations are set, there is a problem that in the case where broadcast time slots overlap with each other he cannot obtain, on the EPG, more detailed information such as an overlap time slot and which reserved program will be recorded during the overlap time slot.

In the case of FIG. 1, for example, although the user can recognize that the broadcast time slots of program-1 and program-3 overlap with each other, he cannot recognize a specific overlap time slot at a glance. And the user cannot recognize which of program-1 and program-3 will be recorded in the overlap time slot.

Further, a technique is known in which program blocks for which recording reservations etc. are set are displayed in a different color than program blocks for which no such settings are made. However, even in such a case, as in the above-described example, a user cannot recognize detailed information such as an overlap time slot at a glance.

DISCLOSURE OF THE INVENTION

The present invention has been made in view of the above circumstances, and makes it possible to easily recognize, on an EPG or the like, detailed information such as an overlap time slot and a setting of a reservation of an action corresponding to which is to be executed in the overlap time slot in an apparatus capable of setting recording reservations for programs whose broadcast time slots overlap with each other.

A first display control apparatus according to the invention is characterized by comprising reservation setting means for setting a recording reservation or a viewing reservation for a program; acquiring means for acquiring electronic program guide information; and display means for displaying the electronic program guide information acquired by the acquiring means, and the display control apparatus is further characterized in that where a broadcast time slot of a program for which a recording reservation or a viewing reservation has been set by the reservation setting means overlaps with that of another program for which a recording reservation or a viewing reservation has been set, the display means displays the electronic program guide information in such a manner that an overlap first time slot is given prescribed discrimination information for discriminating the overlap first time slot from a non-overlap second time slot.

The display means may display the electronic program guide information in such a manner that the first time slot and the second time slot are given different colors.

The first display control apparatus may further comprise priority rank setting means for setting a priority rank to the recording reservation or the viewing reservation that is set for each of the program and the other program, and the display means may display the electronic program guide information by selecting the discrimination information on the basis of the priority ranks set by the priority rank setting means.

A first display control method of a display control apparatus according to the invention is characterized by comprising a reservation setting step of setting a recording reservation or a viewing reservation for a program; an acquiring step of acquiring electronic program guide information; and a display step of displaying the electronic program guide information acquired by processing of the acquiring step, and the first display control method is further characterized in that where a broadcast time slot of a program for which a recording reservation or a viewing reservation has been set by processing of the reservation setting step overlaps with that of another program for which a recording reservation or a viewing reservation has been set, the electronic program guide information is displayed by processing of the display step in such a manner that an overlap first time slot is given prescribed discrimination information for discriminating the overlap first time slot from a non-overlap second time slot.

A second display control apparatus according to the invention is characterized by comprising reservation setting means for setting a recording reservation or a viewing reservation for a program; and display means for displaying, in list form, pieces of reservation information relating to recording reservations or viewing reservations set by the reservation setting means, and the second display control apparatus is further characterized in that where a broadcast time slot of a program for which a recording reservation or a viewing reservation has been set by the reservation setting means overlaps with that of another program for which a recording reservation or a viewing reservation has been set, the display means displays, in list form, the pieces of reservation information to which prescribed pieces of discrimination information indicating whether pieces of reservation information are effective in an overlap time slot are added.

The display means may display, in list form, the pieces of reservation information to which icons indicating whether the pieces of reservation information are effective in the overlap time slot are added as the pieces of discrimination information.

The display means may display, in list form, the pieces of reservation information to which indicators are added as the pieces of discrimination information, each of the indicators being such that of a broadcast time slot of the program a time slot during which an action corresponding to a recording reservation or a viewing reservation will be executed and a time slot during which the action corresponding to the recording reservation or the viewing reservation will not be executed are shown in different colors.

The second display control apparatus may further comprise priority rank setting means for setting a priority rank to the recording reservation or the viewing reservation that is set for each of the program and the other program, and the display means may display, in list form, the pieces of reservation information by selecting the pieces of discrimination information on the basis of the priority ranks set by the priority rank setting means.

A second display control method of a display control apparatus according to the invention is characterized by comprising a reservation setting step of setting a recording reservation or a viewing reservation for a program; and a display step of displaying, in list form, pieces of reservation information relating to recording reservations or viewing reservations set by processing of the reservation setting step, and the second display control method is further characterized in that where a broadcast time slot of a program for which a recording reservation or a viewing reservation has been set by processing of the reservation setting means overlaps with that of another program for which a recording reservation or a viewing reservation has been set, the pieces of reservation information to which prescribed pieces of discrimination information indicating whether pieces of reservation information are effective in an overlap time slot are added are displayed in list form by processing of the display step.

In the first display control apparatus and method, a recording reservation or a viewing reservation is set for a program, electronic program guide information is acquired, and the acquired electronic program guide information is displayed. Where a broadcast time slot of a program for which a recording reservation or a viewing reservation is set overlaps with that of another program for which a recording reservation or a viewing reservation is set, the electronic program guide information is displayed in such a manner that an overlap first time slot is given prescribed discrimination information for discriminating the overlap first time slot from a non-overlap second time slot.

In the second display control apparatus and method, a recording reservation or a viewing reservation is set for a program, and pieces of reservation information relating to recording reservations or viewing reservations that are set are displayed in list form. Where a broadcast time slot of a program for which a recording reservation or a viewing reservation is set by overlaps with that of another program for which a recording reservation or a viewing reservation is set, the pieces of reservation information are displayed in list form to which prescribed pieces of discrimination information indicating whether pieces of reservation information are effective in an overlap time slot are added.

BRIEF DESCRIPTION OF THE DRAWINGS

FIG. 12 shows a list display example of reservation information;

FIG. 16 shows a still another display example of the reservation state indication region shown in FIG. 13; and FIG. 17 shows another list display example of reservation information.

BEST MODE FOR CARRYING OUT THE INVENTION

Figure 1:
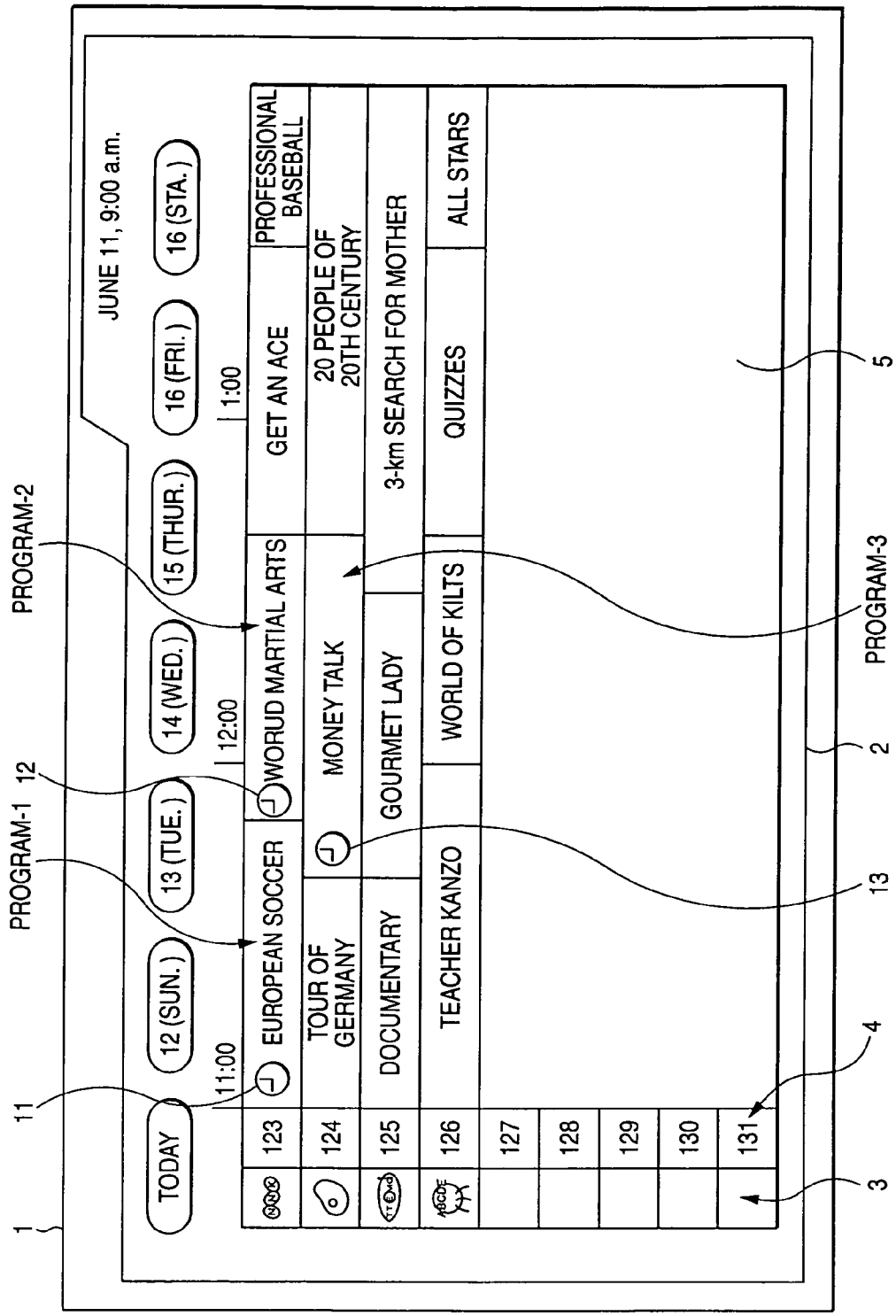
FIG. 1 shows a conventional display example of an EPG.
Figure 2:
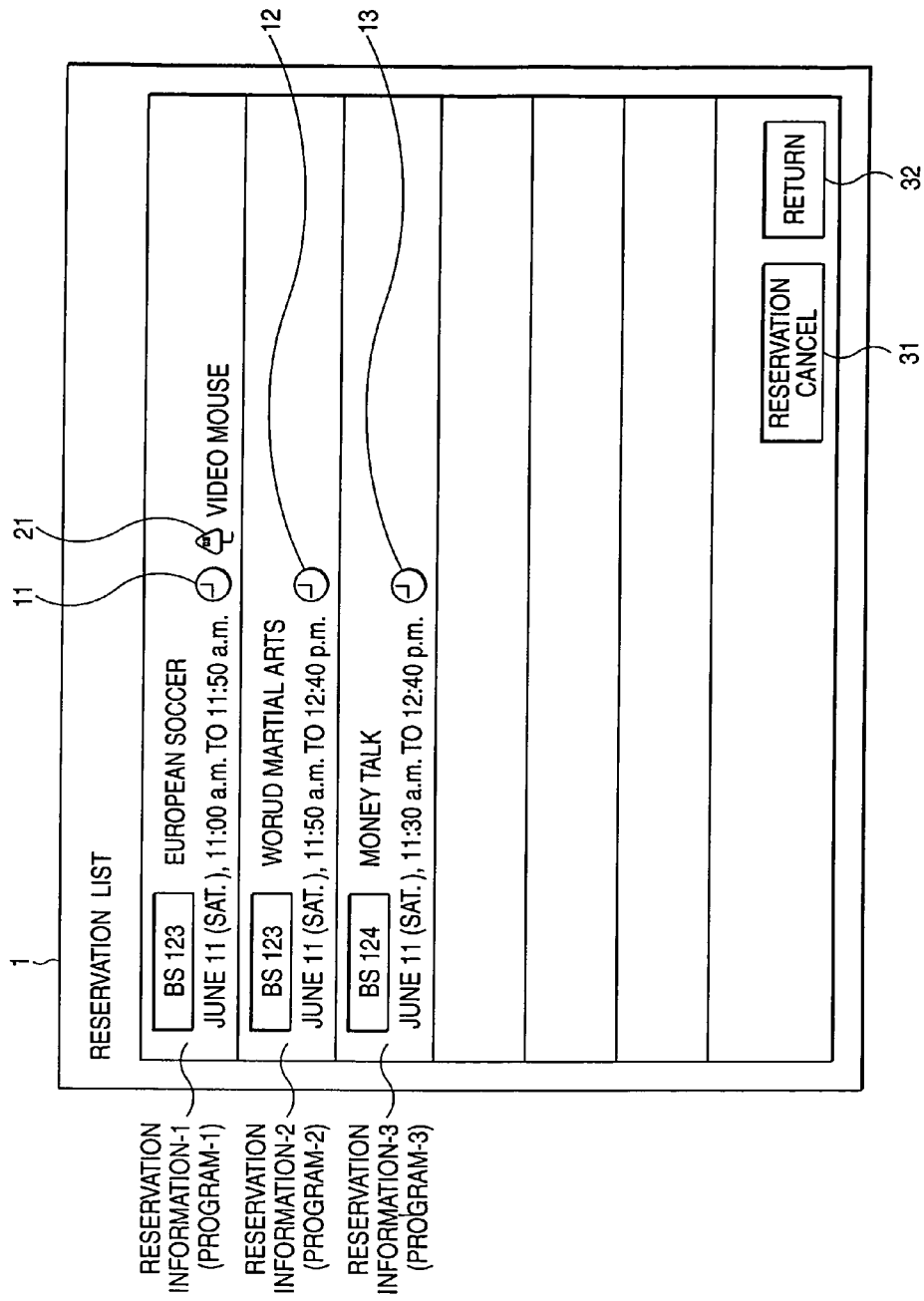
FIG. 2 shows a conventional list display example of reservation information.
Figure 3:
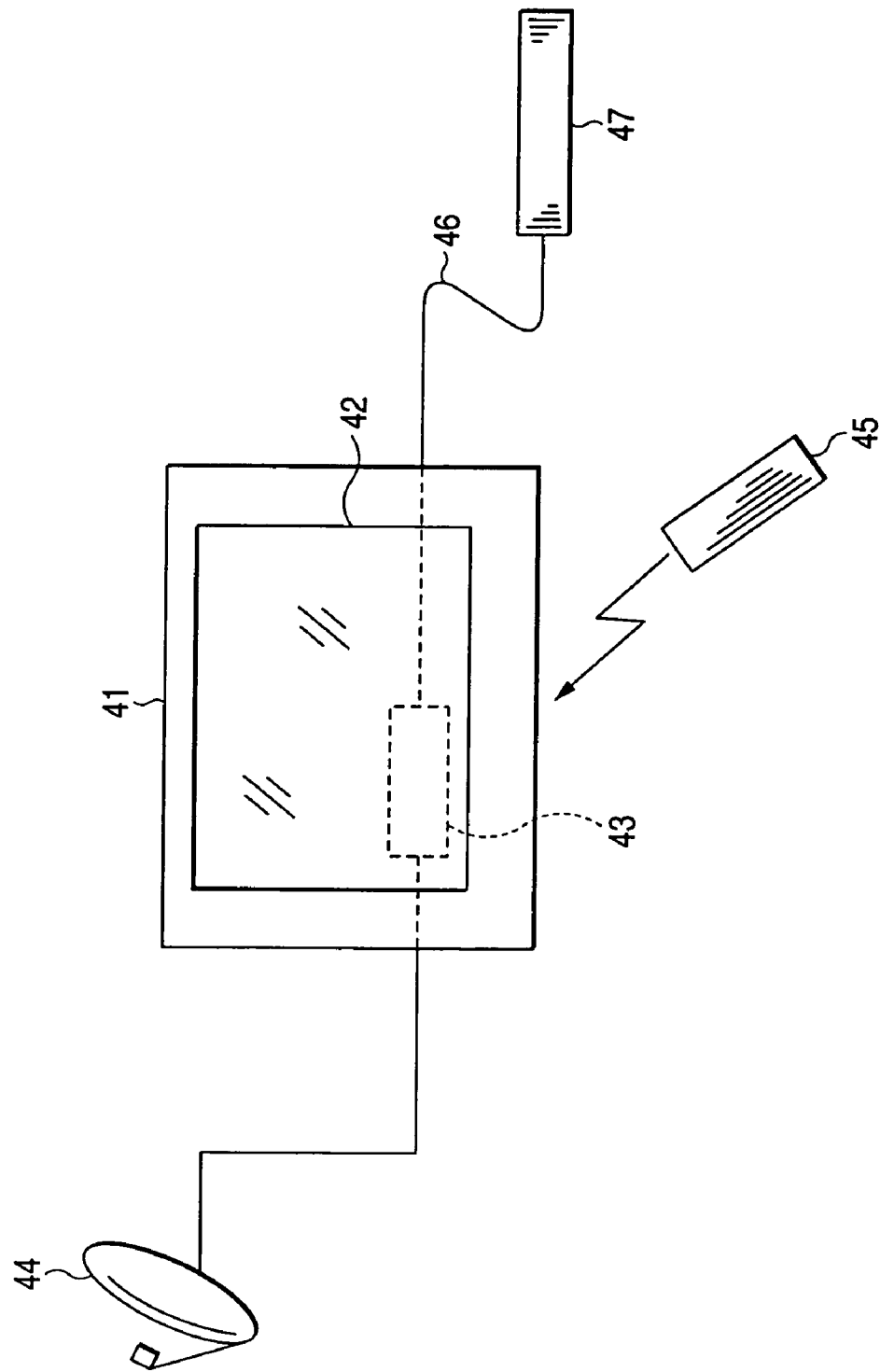
FIG. 3 shows an exemplary configuration of a display control system to which the invention is applied.

FIG. 3 shows an exemplary configuration of a display control system to which the invention is applied.

Incorporating an STB (set top box) 43, a TV receiver 41 displays, on a monitor 42, a picture of a TV program (hereinafter referred to simply as "program") that is reproduced by the STB 43. The TV receiver 41 is provided with speakers (not shown), from which sounds etc. of a program are output.

The STB 43 acquires a reception signal that is supplied from an antenna 44 for receiving digital TV broadcast waves that are transmitted via a BS (broadcasting satellite) or a CS (communications satellite) or a ground-wave digital TV broadcast waves, and reproduces a program or the like corresponding to an instruction from a remote controller 45.

With the STB 43 shown in the figure, by using the remote controller 45 a user can cause the monitor 42 to display an EPG (electronic program guide), and select a TV program to watch or set a viewing reservation so that a program will be displayed when it is started.

By manipulating the remote controller 45, the user can also select, from an EPG, a program to be recorded in a DVCR (digital video cassette recorder) 47 that is connected to the STB 43 by an IEEE (Institute of Electrical and Electronics Engineers) 1394 serial bus 46 and set a recording reservation.

In the display control system of FIG. 3, as described later, when the user makes an instruction to display an EPG, settings of recording reservations and viewing reservations are referred to and an EPG is displayed that includes information (discrimination information) that allows the user to recognize such reservation-set programs at a glance.

For example, programs for which reservations are set are displayed in an EPG in a different color than programs for which no reservations are set. If there exist a plurality of programs for which reservations are set and their broadcast time slots overlap with each other, an overlap time slot is displayed in an EPG in a different color than non-overlap time slots.

That is, in the display control system of FIG. 3, the user can set recording reservations and viewing reservations for a plurality of programs whose broadcast time slots overlap with each other.

Further, if reservations are set for programs whose broadcast time slots overlap with each other, the programs are displayed in an EPG in such colors or manners that a reservation that is set for which program will be made effective when an overlap time slot actually arrives is indicated.

With the above measures, the user can cause display of an EPG and check for what programs recording reservations or viewing reservations have already been set. If reservation-set programs include programs whose broadcast times overlap with each other, the user can easily recognize an overlap time slot and the setting of a reservation that will be made effective when the overlap time slot arrives by checking the colors of those programs.

Although in FIG. 3 the device that records program data that are extracted by the STB 43 is the DVCR 47, it may be any of various recording devices such as a DVD (digital versatile disc) recorder and a hard disk recorder.

Figure 4:
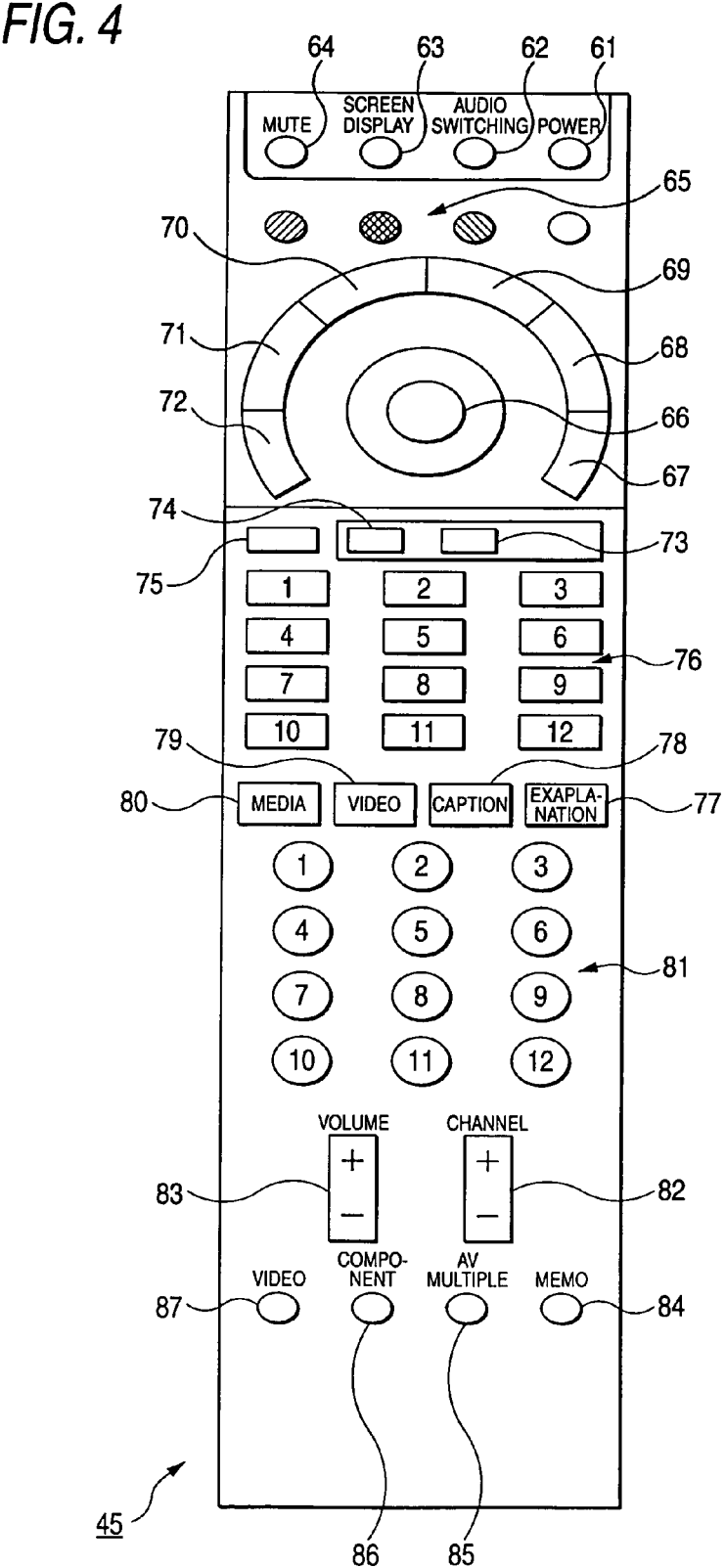
FIG. 4 shows an exemplary appearance of a remote controller shown in FIG. 3.

FIG. 4 shows an exemplary appearance of the remote controller 45 of FIG. 3.

As shown in the figure, the remote controller 45 is provided with a power button 61 (located at the top-right corner) to be manipulated to turn on or off the power, au audio switching button 62 to be manipulated for audio switching, a screen display button 63 to be manipulated to display a currently selected channel, and a mute button 64 to be manipulated for muting.

Provided under the above buttons are color buttons 65 to be manipulated to perform various kinds of selection and a decision button 66 in accordance with the guide of a screen. Provided around the decision button 66 are an EPG button 67 to be manipulated to display an EPG, a MY plus button 68 to be manipulated to display a "MY plus" menu, a return button 69 to be manipulated to return to the preceding picture, a link data button 70 to be manipulated to display link data, a reservation list button 71 to be manipulated to display a list of reservation-set programs (as described above), and a memory stick button 72 to be manipulated to display an image or the like that is recorded in a memory stick (registered trademark) inserted.

Provided under the decision button 66 are a CS button 73 to be manipulated to select the CS broadcast, a BS button 74 to be manipulated to select the BS broadcast, and a ground-wave button 75 to be manipulated to select the ground-wave broadcast.

Provided under the ground-wave button 75 etc. are a BS ten-key 76 to be manipulated to select a BS broadcast channel. Provided under the BS ten-key 76 are a program explanation button 77 to be manipulated to display an explanation of a program being displayed, a caption button 78 to be manipulated to display captions, a video button 79 to be manipulated to switch video angles, and a media button 80 to be manipulated to switch media of video to be displayed.

Provided under a ground-wave ten-key 81 to be manipulated to select a ground-wave broadcast program are a channel button 82 to be manipulated to switch channels and a volume button 83 to be manipulated to increase or decrease the sound volume. Provided under these buttons are a memo button 84 to be manipulated to store a picture being displayed, an AV multiple button 85 to be manipulated to switch inputs of the STB 43, a component button 86, and a video button 87.

Figure 5:
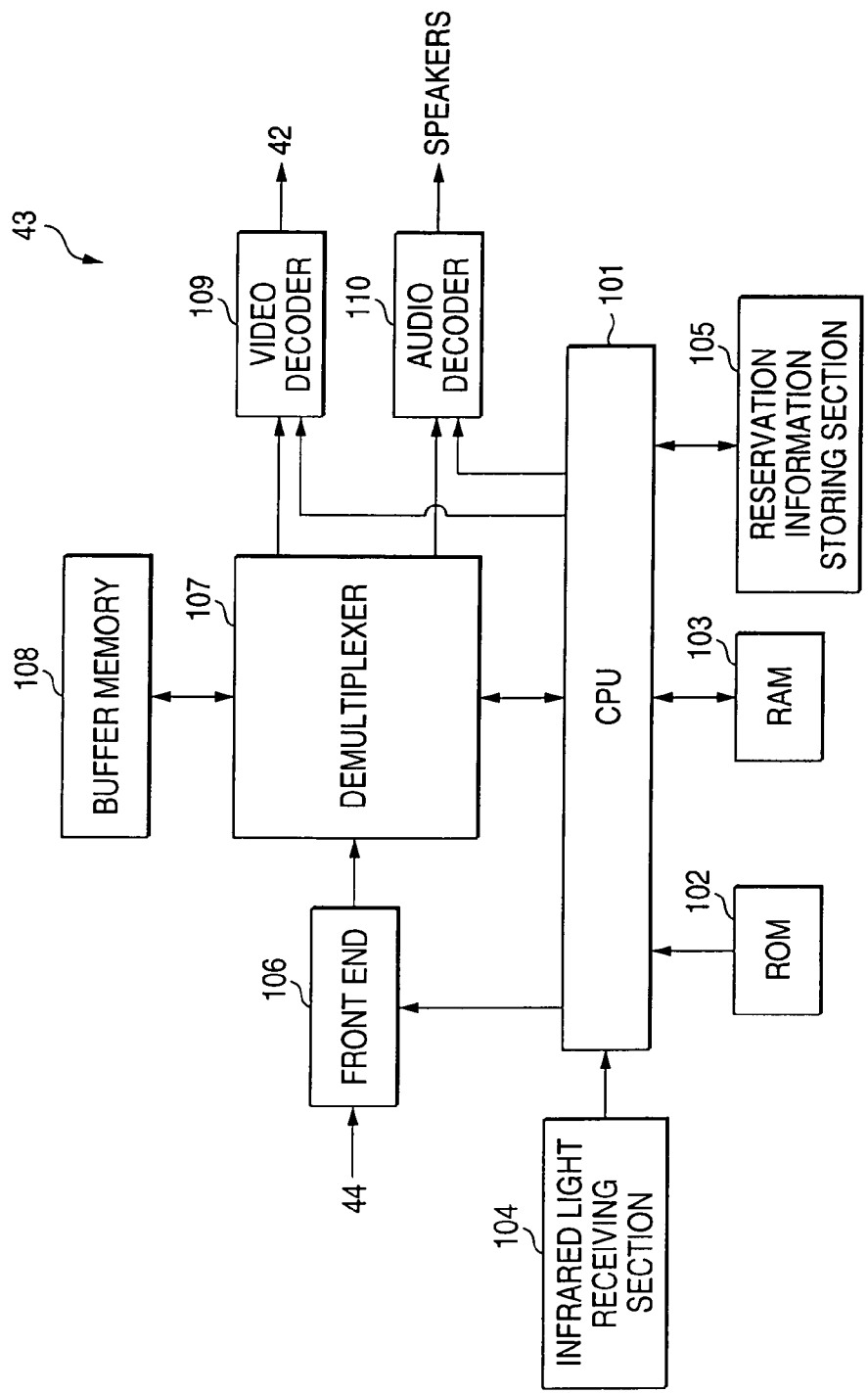
FIG. 5 is a diagram showing an exemplary internal configuration of an STB shown in FIG. 3.

FIG. 5 is a block diagram showing an exemplary internal configuration of the STB 43 shown in FIG. 3.

A CPU (central processing unit) 101 loads, into a RAM (random access memory) 103, a control program that is stored in a ROM (read-only memory) 102, and controls the entire operation of the STB 43 on the basis of an instruction of the user that is supplied from an infrared light receiving section 104, For example, when receiving an instruction of the user to display an EPG on the monitor 42, the CPU 101 refers to EPG data that are supplied from a demultiplexer 107 and reservation information that is read from a reservation information storing section 105 (described later). The CPU 101 generates EPG data in which reservation-set programs are given prescribed colors on the basis priority ranks (described later) that are set for the respective pieces of reservation information, and outputs the generated EPG data to a video decoder 109 and causes the monitor 42 to display those. Detailed processes of the CPU 101 will be described later with reference to flowcharts.

The infrared light receiving section 104 receives infrared light that is emitted from the remote controller 45 and outputs a command corresponding to an instruction of the user to the CPU 101.

The reservation information storage section 105 stores, as reservation information, information of a program for which a recording reservation or a viewing reservation is set when receiving it from the CPU 101. The reservation information storage section 105 reads out stored reservation information with prescribed timing, for example, when the user has made an instruction to display an EPG and supplies it to the CPU 101.

A front end 106 extracts a signal of a prescribed channel on the basis of an instruction from the CPU 101, performs analog/digital conversion processing, QPSK (quadrature phase shift keying) demodulation processing, or error correction processing, or the like on the extracted signal, and outputs an acquired transport stream to the downstream multiplexer 107.

The demultiplexer 107 temporarily stores the received transport stream in a buffer memory 108 and descrambles it using a descrambling key that is supplied from an IC card (not shown), for example. Then, the demultiplexer 107 extracts packets constituting video data of a program specified by the CPU 101 from descrambled data on the basis of their identifiers, and outputs the extracted packets to a video decoder 109. The demultiplexer 107 also extracts packets containing audio data of the program and outputs those to an audio decoder 110.

Further, when instructed by the CPU 101 to extract EPG data (SI (service information)), the demultiplexer 107 extracts packets containing EPG data and outputs those to the CPU 101.

The video decoder 109 reproduces received packets according to the MPEG (Moving Picture Experts Group) 2 scheme, and supplies the reproduced video signal to the monitor 42 and causes the monitor 42 to display it. Likewise, the audio decoder 110, reproduces received packets, and supplies reproduced audio signals to the speakers (not shown) and causes the speakers to output those.

Next, the operation of the display control system of FIG. 3 will be described.

First, a process of the STB 43 for setting a recording reservation or viewing reservation will be described with reference to a flowchart of FIG. 6.

At step S1, the CPU 101 judges whether the user has made an instruction to display an EPG on the basis of an output of the infrared light receiving section 104 or an output of a manipulation section (not shown) where prescribed manipulation buttons are arranged. The CPU 101 waits until judging that such an instruction has been made.

For example, when the user intends to display an EPG and selects a program for which a recording reservation is to be set, he depresses the EPG button 67 of the remote controller 45. If judging at step S1 that an instruction to display an EPG has been made, the CPU 101 moves to step S2.

At step S2, the CPU 101 controls the demultiplexer 107 and causes it to extract packets containing EPG data from a transport stream that is supplied from the front end 106, and acquires those. The CPU 101 outputs, to the video decoder 109, the EPG data that are supplied from the demultiplexer 107 and causes the monitor 42 to display a corresponding picture. The monitor 42 displays an EPG in such a manner that it is superimposed on, for example, a picture of a program currently displayed.

At step S3, the CPU 101 accepts a reservation setting on the basis of an output of the infrared light receiving section 104. To set a recording reservation, for example, the user selects a desired program from the programs being displayed in the EPG and makes a setting therefor by manipulating the color buttons 65 and the decision button 66. The user can set a viewing reservation in a similar manner.

At step S4, the CPU 101 stores, in the reservation information storing section 105, reservation information indicating details of the reservation of the program that has been specified by the user. For example, information indicating a title, a broadcast start time, a broadcast end time, a channel number of the program that has been selected by the user, information indicating whether the reservation is a recording reservation or a viewing reservation, information indicating in what recording device the program is to be recorded (in the case where a plurality of recording devices are connected to the STB 43), and other information are stored in the reservation information storing section 105 as reservation information.

By referring to time information that is supplied from a timer (not shown) and the above reservation information, the CPU 101 judges whether a time point of the start of broadcast of the reservation-set program has arrived. If judging that such a time point has arrived, the CPU 101 controls the individual sections of the STB 43 to cause the STB 43 to perform an operation corresponding to the reservation information.

Next, a process of the STB 43 for setting a priority rank of reservation information will be described with reference to a flowchart of FIG. 7. As described above, the STB 43 allows setting of reservations for a plurality of programs whose broadcast time slots overlap with each other. When an overlap time slot has arrived, the CPU 101 checks priority ranks that are set for pieces of reservation information of the programs, respectively, and executes an action corresponding to a piece of reservation information for which a highest priority rank is set with priority given to it over actions corresponding to the other pieces of reservation information.

Figure 6:
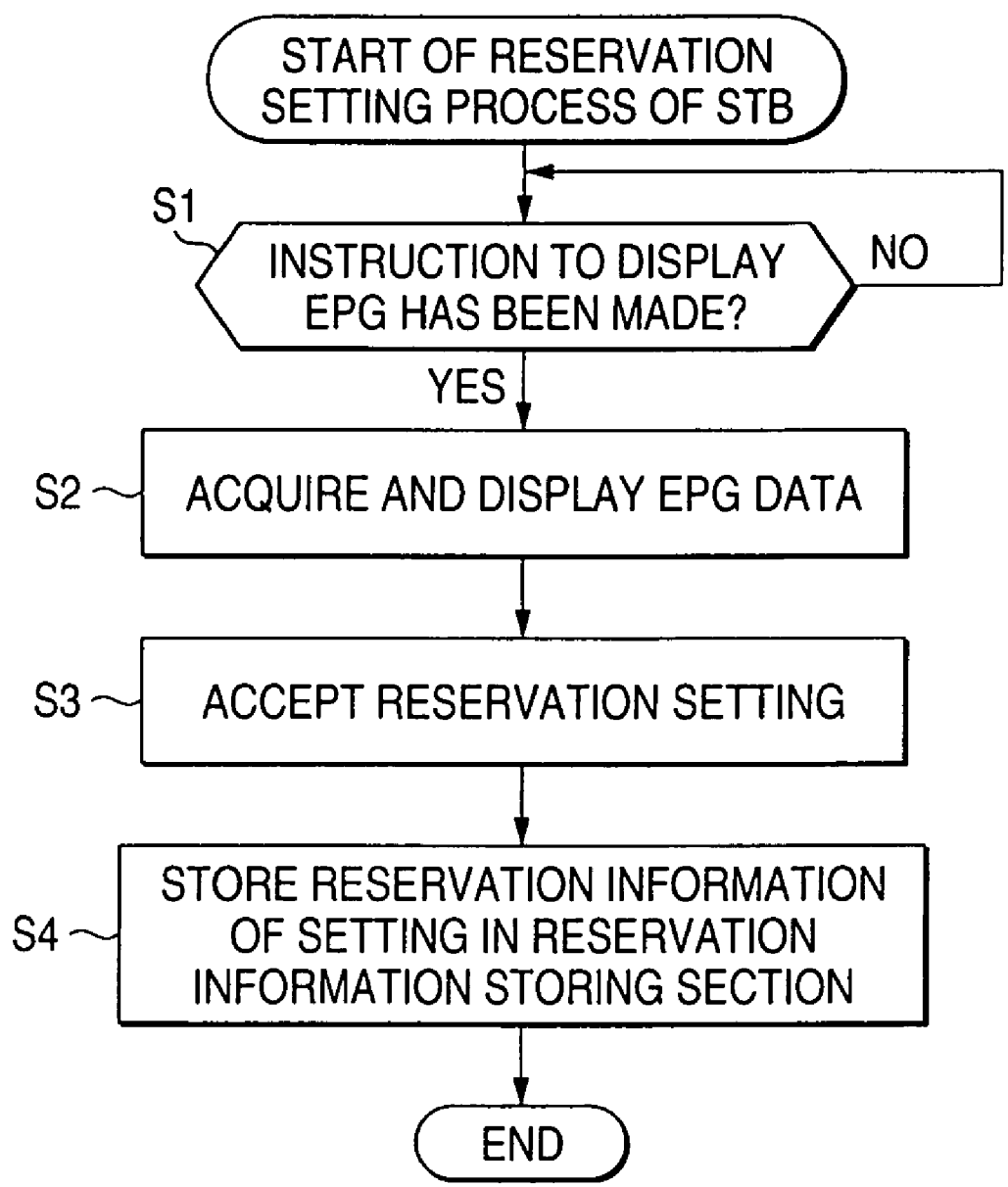
FIG. 6 is a flowchart for description of a process of the STB shown in FIG. 3.

This process is executed with prescribed timing, for example, when a reservation setting process as shown in FIG. 6 has been executed.

At step S11, the CPU 101 reads out the pieces of reservation information stored in the reservation information storing section 105 and recognizes the contents of their settings.

At step S12, on the basis of the reservation information that has been recognized at step S11, the CPU 101 judges whether there exists a program whose broadcast time slot overlaps with the broadcast time slot of another program. If judging that no such program exists, the CPU 101 finishes the execution of the process. That is, an action corresponding to a reservation that is set for a program whose broadcast time slot does not overlap with the broadcast time slot of any other program will be executed reliably at a broadcast start time of that program.

On the other hand, if judging at step S12 that there exists a program whose broadcast time slot overlaps with the broadcast time slot of another program, the CPU 101 moves to step S13, where the CPU 101 recognizes broadcast start times of the respective programs. At step S14, the CPU 101 judges whether there exist programs that will start to be broadcast at the same time point. If judging that they will start to be broadcast at different time points, the CPU 101 moves to step S15.

At step S15 the CPU 101 sets priority ranks in descending order for the programs from a program having an earliest broadcast start time, and finishes the execution of the process. For example, if the reservation-set programs include a first program that will be broadcast for one hour from 9 a.m. and a second program that will be broadcast for one hour from 9:30 a.m., a higher priority rank is set for the first program. During the overlap time slot, that is, from 9:30 a.m. to 10 a.m., an action corresponding to the reservation that is set for the first program will be executed. Therefore, if a recording reservation is set for the second program, recording of the second program will start after a lapse of 30 minutes from the start of its broadcast.

On the other hand, if judging at step S14 that there exist programs that will start to be broadcast at the same time point, the CPU 101 moves to step S16, where the CPU 101 judges whether a PPV (pay per view; a user is charged every time he views it) program exists. Since it is expected that the user attaches more importance to PPV programs, an exemplary measure is such that higher priority ranks are set for PPV programs than for the other, non-PPV programs.

If judging at step S17 that a PPV program exists, the CPU 101 moves to step S18, where the CPU 101 judges there exist a plurality of PPV programs. If judging at step S18 that there do not exist a plurality of PPV programs, the CPU 101 moves to step S19, where the CPU 101 sets the highest priority rank to the PPV program.

Then, the CPU 101 moves to step S20, where the CPU 101 checks service IDs (channel numbers) of programs, if any, for which no priority ranks are set. At step S21, the CPU 101 sets priority ranks in descending order for those programs from a program having a smallest service ID. Then, the CPU 101 finishes the execution of the process.

On the other hand, if judging at step S17 that there exists no PPV program or if judging at step S18 that there exist a plurality of PPV programs, the CPU 101 moves to step S20, where the CPU 101 checks service IDs of respective programs, if any, for which no priority ranks are set. Then, at step S21, the CPU 101 sets priority ranks in descending order for those programs from a program having a smallest service ID.

Assume that reservations are set for programs whose broadcast times overlap with each other. When an overlap time slot has arrived, the STB 43 judges, on the basis of their priority ranks that have been set in the above-described manner, an action corresponding to a reservation that is set for which program should be executed (i.e., which reservation information is effective) and executes a recording reservation or a viewing reservation.

For example, the priority ranks that have been set by the above process are stored in the reservation information storing section 105 in such a manner as to be associated with the respective pieces of reservation information.

Figure 8:
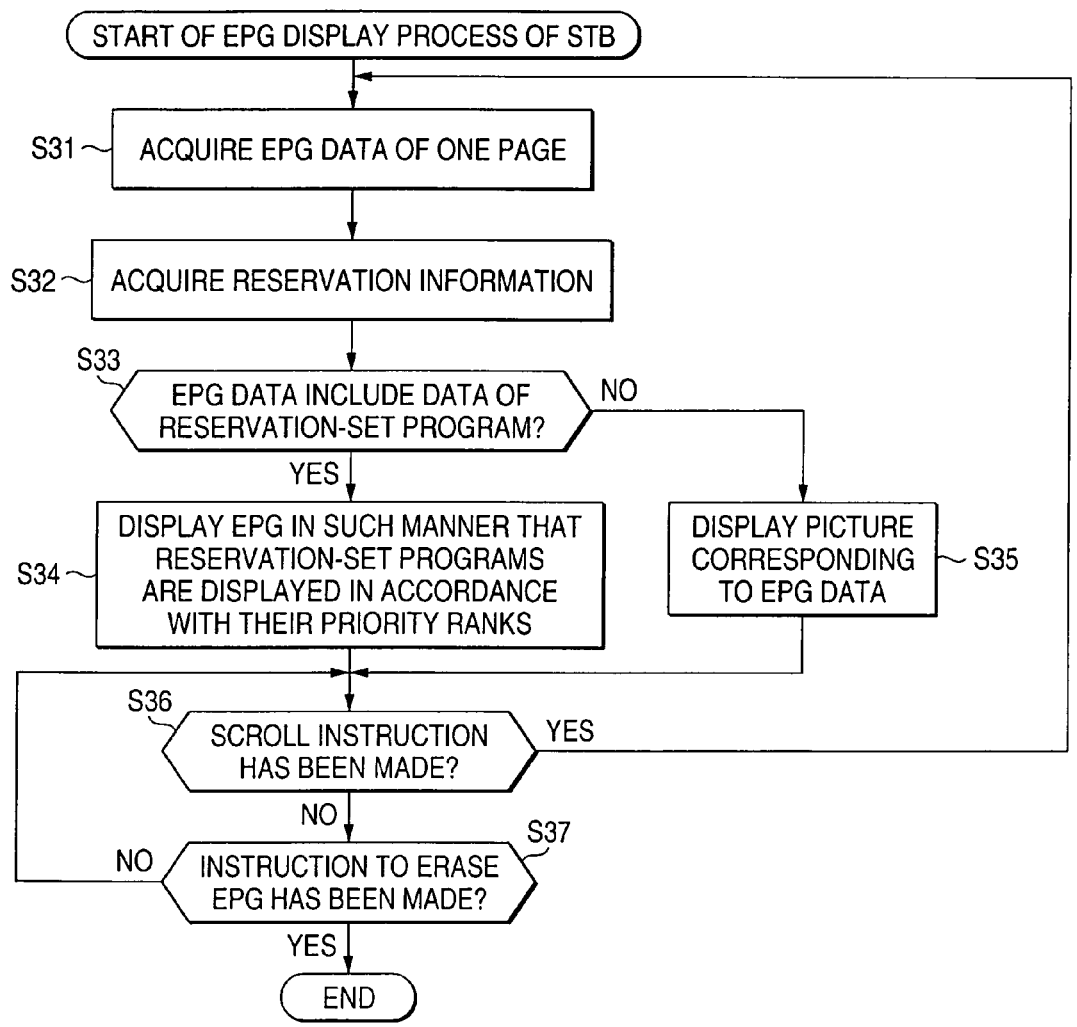
FIG. 8 is a flowchart for description of still another process of the STB shown in FIG. 3.

Next, a process of the STB 43 for displaying an EPG will be described with reference to a flowchart of FIG. 8.

At step S31, in response to an instruction of the user to display an EPG (i.e., a manipulation on the EPG button 67), the CPU 101 controls the demultiplexer 107 and thereby acquires EPG data of one page (i.e., an amount of data to be displayed in one picture), for example, to be displayed on the monitor 42.

At step S32, the CPU 101 reads out and acquires the reservation information that is stored in the reservation information storing section 105. At step S33, the CPU 101 refers to the EPG data and the reservation information and judges whether the acquired EPG data include data relating to a reservation-set program (i.e., whether programs to be guided by the EPG data include a reservation-set program).

If judging at step S33 that the EPG data acquired at step S31 include data relating to a reservation-set program, the CPU 101 moves to step S34, where the CPU 101 displays an EPG in which reservation-set programs are given colors corresponding to their priority respective ranks.

Figure 9:
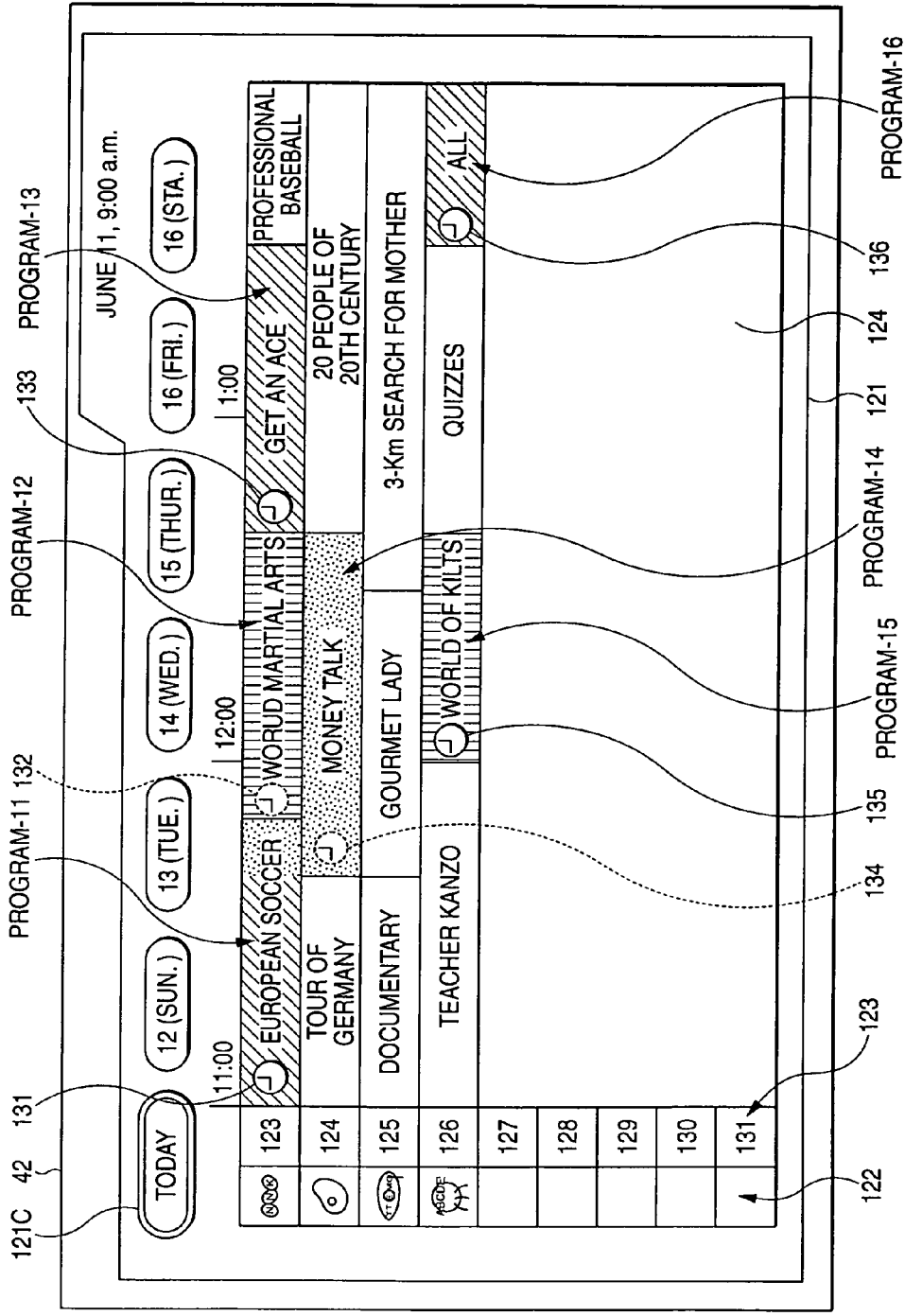
FIG. 9 shows an EPG display example.

FIG. 9 shows an EPG example to be displayed on the monitor 42.

In the example of the figure, an EPG 121 is displayed on the monitor 42 so as to be superimposed on a program picture. The horizontal axis represents the time and the vertical axis represents channels. As indicated by a cursor 121C, the EPG 121 relates to programs to be broadcast today (June 11) and contains information corresponding to a time slot of a.m. 11 to p.m. 2. The user can cause display of an EPG of another day by moving the cursor 121C.

The information of the EPG 121 is of programs to be broadcast on channel-123 to channel-131. Although programs and logos of broadcasting companies of channel-127 to channel-131 are omitted for the sake of convenience of description, actually they are displayed in the same manner as those of channel-123 to channel-126.

Basically, the EPG 121 consists of, from its left side, a logo display region 122 where the logos of broadcasting companies are displayed, a channel display region 123 where the channels (service IDs) of those companies are displayed, and a program display region 124 where programs to be broadcast on the respective channels are displayed in the form of rectangles (blocks) whose lengths correspond to their respective broadcast times.

The titles of the respective programs are shown in the respective blocks that are displayed in the program display region 124. A reservation icon is displayed on the left of the title of each reservation-set program.

For example, a title "European Soccer" is displayed in the block of program-11 that will be broadcast on channel-123 from 11 a.m. to 11:50 a.m. and a reservation icon 131 is displayed on the left of the title. A title "World Martial Arts" is displayed in the block of program-12 that will be broadcast on channel-123 from 11:50 a.m. to 12:40 p.m. and a reservation icon 132 is displayed on the left of the title. A title "Get an Ace" is displayed in the block of program-13 that will be broadcast on channel-123 from 12:40 p.m. to 1:40 p.m. and a reservation icon 133 is displayed on the left of the title.

A title "Money Talk" is displayed in the block of program-14 that will be broadcast on channel-124 from 11:40 a.m. to 12:40 p.m. and a reservation icon 134 is displayed on the left of the title.

Further, a title "World of Kilts" is displayed in the block of program-15 that will be broadcast on channel-126 from 12 p.m. to 12:40 p.m. and a reservation icon 135 is displayed on the left of the title. A title "All (All Stars)" is displayed in the block of program-16 that will be broadcast on channel-126 from 1:40 a.m. to 2 p.m. and a reservation icon 136 is displayed on the left of the title.

In the figure, the reservation icons 131, 133, 135, and 136 are drawn by solid lines whereas the reservation icons 132 and 134 are drawn by broken lines. The two kinds of icons indicate different reservation types such as recording reservation and viewing reservation; that is, icons are given different colors in accordance with their respective reservation types.

For example, the reservation icons 131, 133, 135, and 136 which are drawn by solid lines are icons indicating that recording reservations are set for the programs, and are displayed in red. The reservation icons 132 and 134 which are drawn by broken lines are icons indicating that viewing reservations, for example, are set for the programs, and are displayed in blue.

Therefore, the user can judge, on an EPG, whether a reservation is already set for a program merely by checking whether an icon is present or absent without the need for checking detailed reservation information. Further, the user can judge a setting state of the reservation merely by checking the color of the icon.

As described above, the blocks of reservation-set programs are displayed in a different color than those of non-reservation-set programs. Further, if the broadcast time slots of reservation-set programs overlap with each other, in an overlap time slot the programs are displayed in colors that depend on priority ranks that are set for the respective pieces of reservation information to allow the user to discriminate the overlap time slot from non-overlap time slots at a glance.

Figure 10:
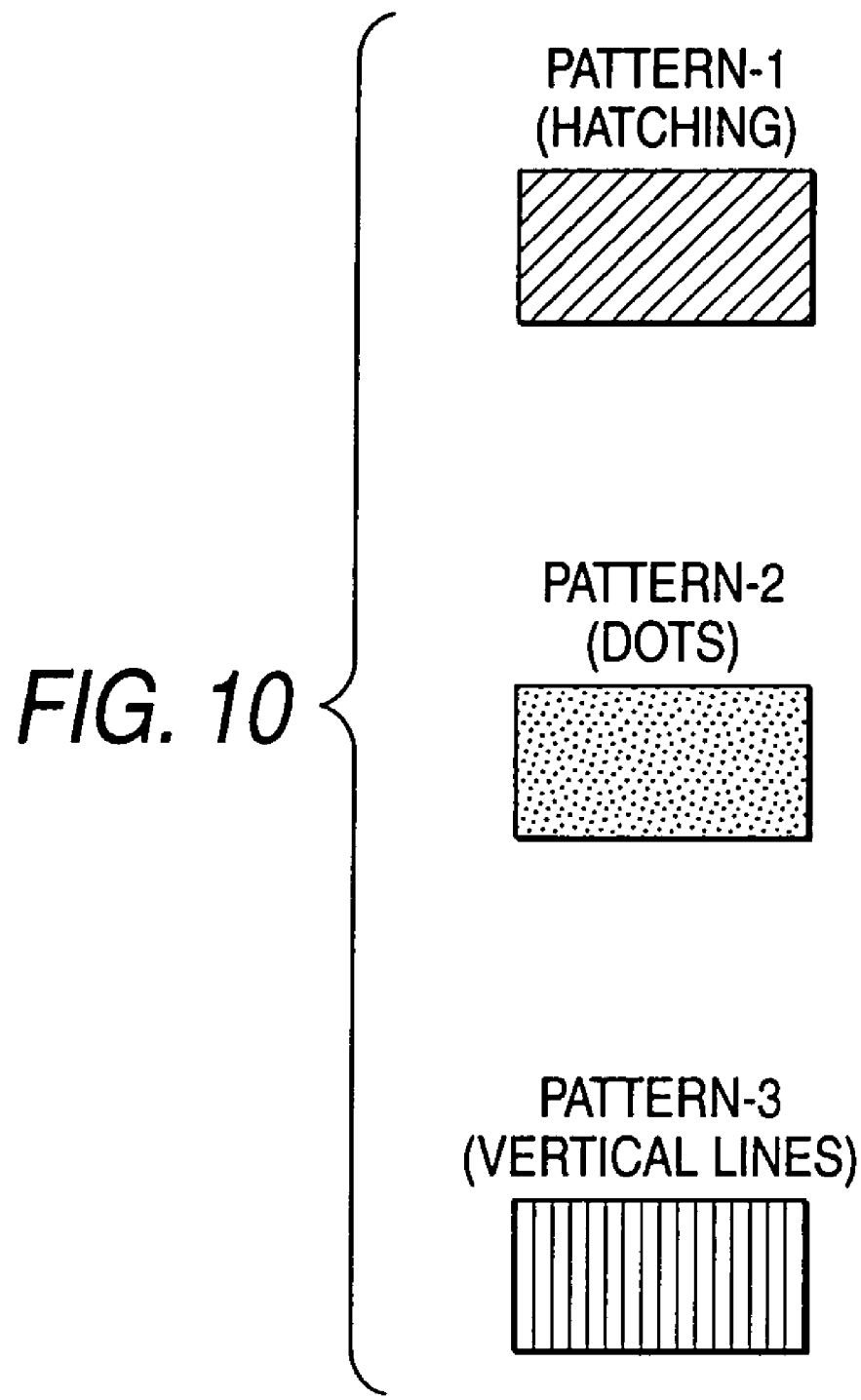
FIG. 10 shows colors that are given to blocks of the EPG of FIG. 9.

Three colors, for example, are set as colors to be given to respective blocks in accordance with their respective priority ranks. FIG. 10 shows patterns corresponding to the three colors.

A time slot that is given pattern-1 (hatching) in FIG. 10 is a time slot during which an action corresponding to a reservation can be executed because it does not overlap with the time slot of any other program. A time slot that is given pattern-2 (dots) is a time slot during which an action corresponding to a reservation can be executed because although it overlaps with the time slot of another program a higher priority rank is set for the program than for the other program. A time slot that is given pattern-3 (vertical lines) is a time slot during which an action corresponding to a reservation cannot be executed because it overlaps with the time slot of another program and a lower priority rank is set for the program than for the other program.

For example, in FIG. 9, a period of program-11 of 11 a.m. to 11:40 a.m. is given pattern-1 and its period of 11:40 a.m. to 11:50 a.m. is given pattern-2. Therefore, program-11 is recorded as reserved during the period of 11 a.m. to 11:40 a.m. Program-11 is also recorded during the period of 11:40 a.m. to 11:50 a.m. because although this period overlaps with the time slot of another program (program-14) a higher priority rank has been set for program-11 than for program-14 by a priority rank setting process as described above with reference to FIG. 7.

Figure 7:
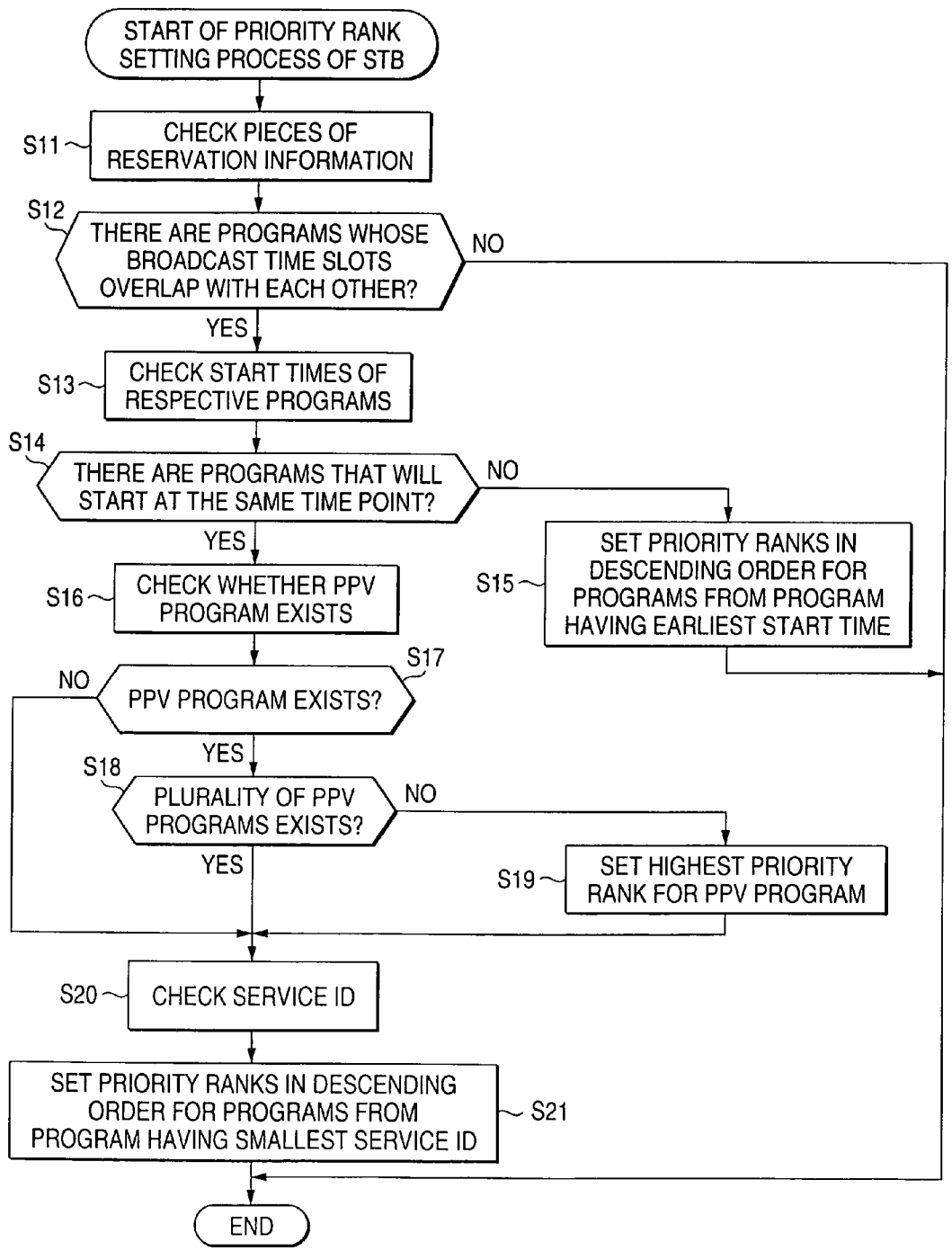
FIG. 7 is a flowchart for description of another process of the STB shown in FIG. 3.

More specifically, since program-11 starts to be broadcast earlier than program-14, a higher priority rank is set for program-11 than for program-14 at step S15 in FIG. 7.

Similarly, the broadcast times of program-12 and program-14 overlap with each other in a period of 11:50 a.m. to 12:40 p.m. All the block of program-12 is given pattern-3. A period of program-14 of 11:40 a.m. to 11:50 a.m. is given pattern-3 and its period of 11:50 a.m. to 12:40 p.m. is given pattern-2.

Therefore, program-14 is displayed as reserved from 11:50 a.m. to 12:40 p.m. and program-12 is not displayed though the viewing reservation is set.

As described above, the user can easily judge whether a reservation that is set for a program is effective (i.e., whether an action corresponding to the reservation will be executed) by checking a color of the block of the program. If the broadcast time slot of the program overlaps with that of another program, the user can recognize which program will be subjected, during an overlap time slot, to an action corresponding to a reservation that is set for the program.

Therefore, if it is found by checking an EPG that reservations are not set in a desired manner, the user can easily judge what reservations should be canceled or changed.

Similarly, the user can easily recognize that program-15 whose broadcast time slot overlaps with the broadcast time slot of program-14 will not be recorded contrary to the reservation and that program-13 and program-16 will be recorded as reserved.

Returning to FIG. 8, if judging at step S33 that the EPG data acquired at step S31 do not include data relating to any reservation-set program, the CPU 101 moves to step S35, where the CPU 101 causes the monitor 42 to display an EPG corresponding to the acquired EPG data.

That is, an EPG having none of the various kinds of reservation icons and the colors as discrimination information, which is in contrast to the EPG 121 in FIG. 9, is displayed on the monitor 42.

At step S36, the CPU 101 judges, on the basis of an output of the infrared light receiving section 104, whether an instruction to scroll the EPG being displayed has been made. If judging that a scroll instruction has been made, the CPU 101 returns to step S31 and repeats the subsequent steps.

That is, an EPG that is different in time slot or date from the EPG that has been displayed so far is displayed. If there exist programs for which recording reservations etc. are set, various colors and icons are given to those programs as pieces of discrimination information.

On the other hand, if judging at step S36 that an instruction to scroll the EPG has not been made, the CPU 101 moves to step S37, where the CPU 101 judges whether an instruction to erase the EPG has been made. If judging at step S37 that an instruction to erase the EPG has not been made, the CPU 101 returns to step S36 and repeats the subsequent steps. If judging that an erase instruction has been made, the CPU 101 finishes the execution of the process.

With the above process, various icons and colors on the EPG are given to programs for which reservations of recording etc. are set. Therefore, the user can recognize, at a glance, the reserved actions to be executed during the respective time slots.

Further, as described above, the user can check detailed information on reservations that are set by causing it to be displayed in list form.

Next, a process of the STB 43 for displaying reservation information in list form will be described with reference to a flowchart FIG. 11.

In response to an instruction of the user to display reservation information in list form (i.e., a manipulation on the reservation list button 71), at step S51 the CPU 101 reads reservation information of one page (one picture) from the reservation information storing section 105 and acquires it.

At step S52, the CPU 101 judges whether there exist pieces of reservation information of programs whose broadcast time slots overlap with each other. If judging that such pieces of reservation information exist, the CPU 101 moves to step S53, where the CPU 101 generates pieces of reservation information of the programs that include pieces of discrimination information corresponding to their respective priority ranks. The CPU 101 outputs the generated pieces of reservation information to the video decoder 109 and displays those in list form.

Figure 12:
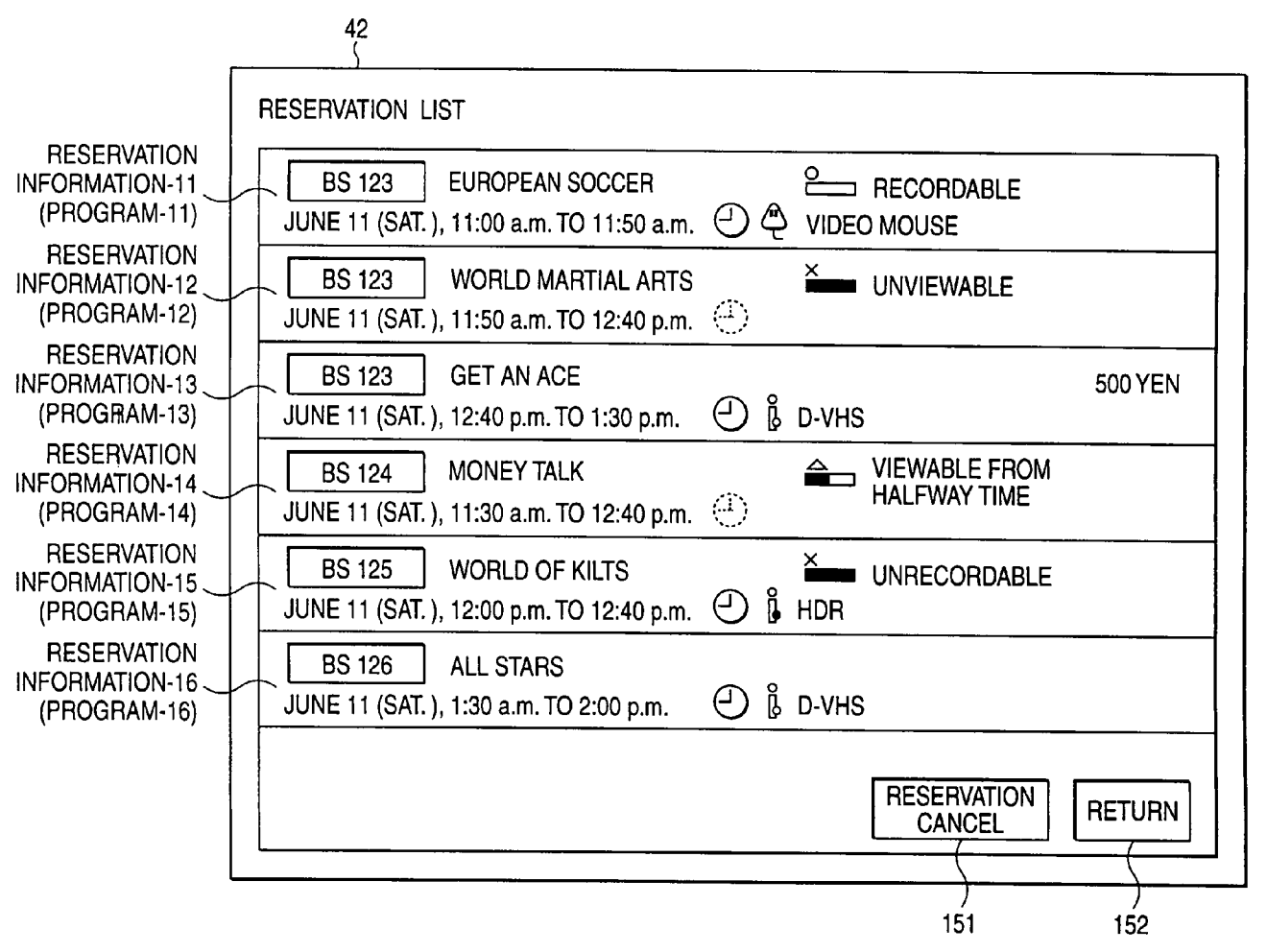

FIG. 12 shows a list display example of pieces of reservation information on the monitor 42 at step S53.

The pieces of reservation information shown in FIG. 12 are of the respective programs that were described with reference to FIG. 9 as programs for each of which a recording reservation or a viewing reservation is set.

Specifically, in FIG. 12, pieces of reservation information of program-11, program-12, and program-13 are shown as reservation information-11, reservation information-12, and reservation information-13, respectively. Pieces of reservation information of program-14, program-15, and program-16 are shown as reservation information-14, reservation information-15, and reservation information-16, respectively.

Each displayed reservation information includes a program title, a broadcast channel, and information indicating a broadcast date and time, a reservation icon (mentioned above), information indicating a recording device to record the program, information indicating whether the reservation currently set is effective or not, and other information.

A reservation cancel button 151 to be manipulated to cancel a reservation currently set and a return button 152 to be manipulated to return to a picture that was displayed immediately before are displayed at bottom positions of the screen of the monitor 42.

Figure 13:
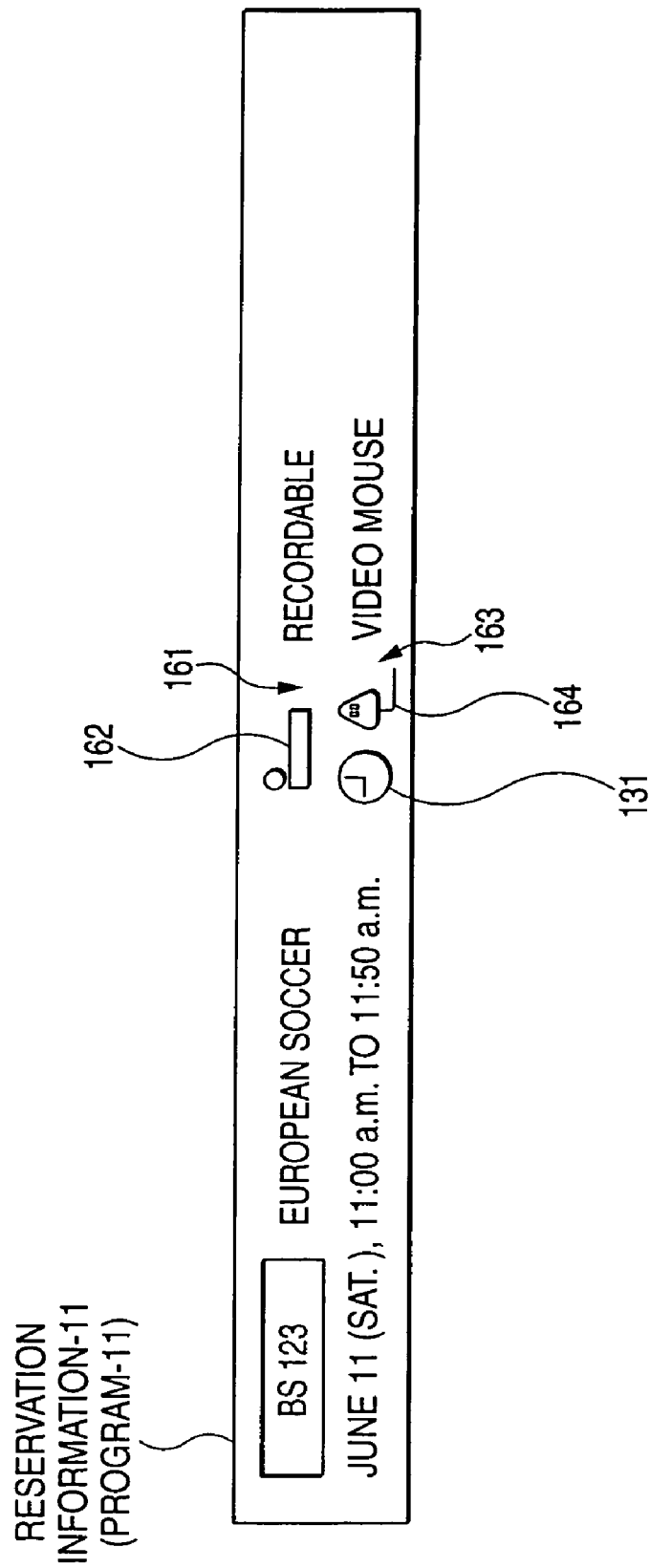
FIG. 13 shows, in an enlarged manner, reservation information-1 in the list display of FIG. 12.

FIG. 13 shows, in an enlarged manner, one piece of reservation information (reservation information-11) in the list display of FIG. 12.

As shown in the figure, reservation information-11 shows that the channel of program-11 is BS digital broadcast channel-123, its title is "European Soccer," and its broadcast date and time are 11 a.m. to 11:50 a.m. of June 11 (Saturday).

A reservation icon 131 is displayed on the right of the broadcast date and time, and a reservation state display region 161 is provided above the reservation icon 131. The reservation state display region 161 is a region where to display information indicating whether the reservation currently set is effective (i.e., information indicating effectiveness).

In the reservation state display region 161, a reservation state indication icon 162 for allowing the user to recognize a reservation state at a glance is displayed and an explanation of the reservation state indication icon 162 is displayed in text form adjacent to it.

In the exemplary reservation state display region 161 shown in FIG. 13, as in the case of the EPG 121, a reservation state indication icon 162 is displayed that consists of a figure (rectangle) indicating a block in which the horizontal axis represents the time and a mark "○" (circle) indicating that the reservation is effective. A word (text) "Recordable" is displayed on its right.

A connected device display region 163 is provided under the reservation state display region 161. A connected device indication icon 164 that indicates a control device for controlling a device for recording program-11 and a cable that is connected to the recording device is displayed in the connected device display region 163. A word (text) as an explanation of the icon 164 is displayed adjacent to it.

In the example of FIG. 13, a connected device indication icon 164 indicating an appearance of a video mouse as control device for controlling a device for recording program-11 is displayed. A word (text) "Video mouse" is displayed on its right.

As described above, for each piece of reservation information of a program whose broadcast time slot overlaps with the broadcast time slot of another program, information indicating whether the reservation is effective or not is displayed in the form of an icon (reservation state indication icon 162) and a text. Therefore, the user can recognize, at a glance, whether the reservation is effective.

Referring to FIG. 12, a reservation state indication icon 162 that consists of a solid block indicating that program-12 for which the viewing reservation is set will not be displayed and a mark "x" (cross) is displayed in the reservation state indication region 161 of reservation information-12. A word (text) "Unrecordable" as an explanation of the reservation state is displayed adjacent to the icon 162. As described above with reference to FIG. 9, program-12 ("World Martial Arts") for which the viewing reservation is set will not be displayed because it conflicts with a reservation that is set for another program.

A reservation state indication icon 162 that consists of a half-solid block indicating that viewing reservation will be displayed from a halfway time and a mark "△" (triangle) is displayed in the reservation state indication region 161 of reservation information-14. A text "Viewable from a halfway time" as an explanation of the reservation state is displayed adjacent to the icon 162.

The same icon as the reservation state indication icon 162 of reservation information-12 is displayed in the reservation state indication region 161 of reservation information-15, and a word (text) "Unrecordable" is displayed. A connected device indication icon 164 indicating that a device for recording program-15 is connected via an IEEE 1394 serial bus and a word (text) "HDR" indicating that the recording device is a hard disk recorder are displayed in the connected device indication region 163.

As described above, for each of the pieces of reservation information of program-11, program-12, program-14, and program-15 each of whose broadcast time slots overlaps with the broadcast time slot of another program, the reservation state indication icon 164 indicating the reservation state (whether the reservation is effective) of the overlap time slot and the text are displayed in the reservation state indication region 161.

Therefore, as shown in FIG. 9, no information is displayed in the reservation state indication regions 161 of reservation information-13 and reservation information-16 of program-13 and program-16 each of whose broadcast time slots does not overlap with the broadcast time slot of any program.

Therefore, the user can recognize, at a glance, that the broadcast time of each of program-13 and program-16, for example, does not overlap with the broadcast time of any program for which a reservation is set and hence reservation information-13 and reservation information-16 are effective.

For reservation information-13, a connected device indication icon 164 indicating that the cable connected to a device for recording program-13 is the IEEE 1394 serial bus 46 and a word (text) explaining that the device is a D-VHS device (DVCR 47) are displayed. The facts that program-13 is a PPV program and the fee is "500 yen" are displayed on the right of the reservation state indication region 161 of reservation information-13.

Figure 11:
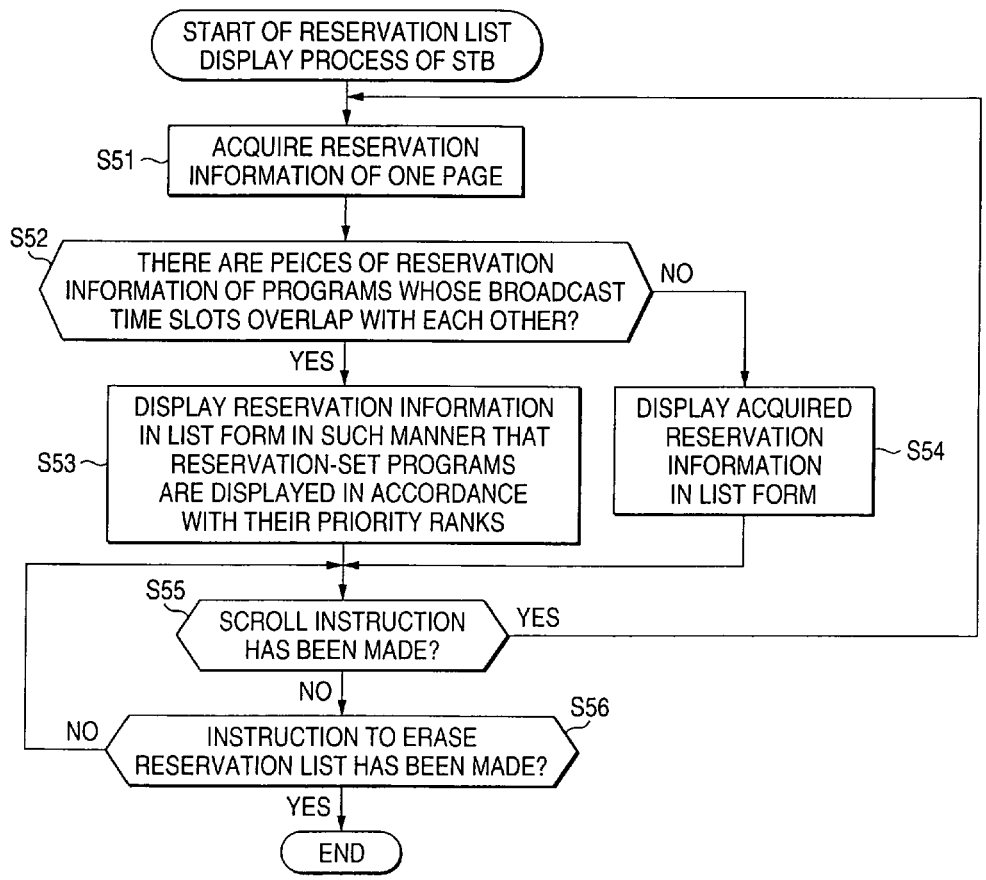
FIG. 11 is a flowchart for description of a process of the STB shown in FIG. 3.

Returning to the description of FIG. 11, at step S52, the CPU 101 judges whether there exist pieces of reservation information of programs whose broadcast time slots overlap with each other. If judging that no such reservation information exists, the CPU 101 moves to step S54, where the CPU 101 displays the acquired pieces of reservation information in list form.

That is, a reservation list that is in contrast to the reservation list of FIG. 12 in that no information is displayed in the reservation state indication regions 161 of the respective pieces of reservation information is displayed on the monitor 42.

At step S55, the CPU 101 judges whether an instruction to scroll the reservation list (i.e., an instruction to display another picture) has been made. If judging that a scroll instruction has been made, the CPU 101 returns to step S51 and repeats the subsequent steps. On the other hand, if judging at step S55 that a scroll instruction has not been made, the CPU 101 moves to step S56, where the CPU 101 judges, on the basis of an output of the infrared light receiving section 104, whether an instruction to erase the reservation list has been made.

If judging at step S56 that an instruction to erase the reservation list has not been made, the CPU 101 returns to step S55 and repeats the subsequent steps. If judging that an erase instruction has been made, the CPU 101 finishes the execution of the process.

As described above, in the case where reservations are set for programs whose broadcast time slots overlap with each other, icons and texts as discrimination information are displayed as parts of respective pieces of reservation information when the pieces of reservation information are displayed in list form. Therefore, the user can recognize an effective reservation at a glance.

Although it was mentioned above that the reservation state indication icon 162 and the text as an explanation of the icon 162 are displayed in the reservation state indication region 161, various kinds of information may be displayed as discrimination information as long as they allow the user to easily recognize the reservation state.

Figure 14A:
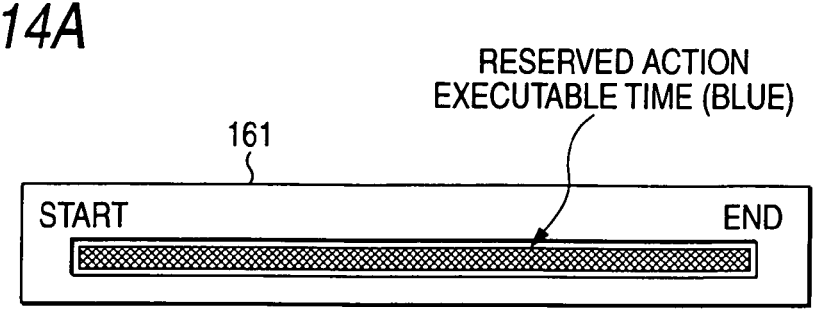
FIG. 14A shows a first display example of a reservation state indication region shown in FIG. 13.
Figure 14B:
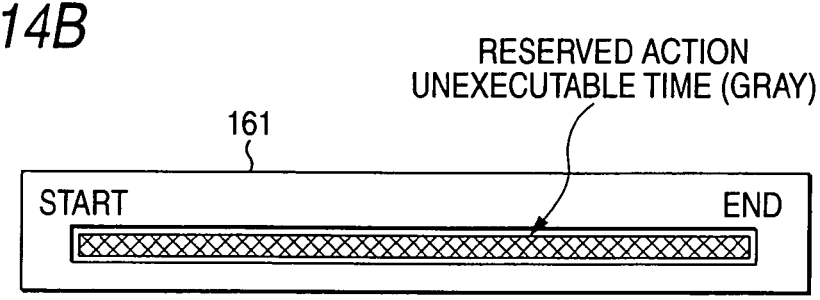
FIG. 14B shows a second display example of the reservation state indication region shown in FIG. 13.
Figure 14C:
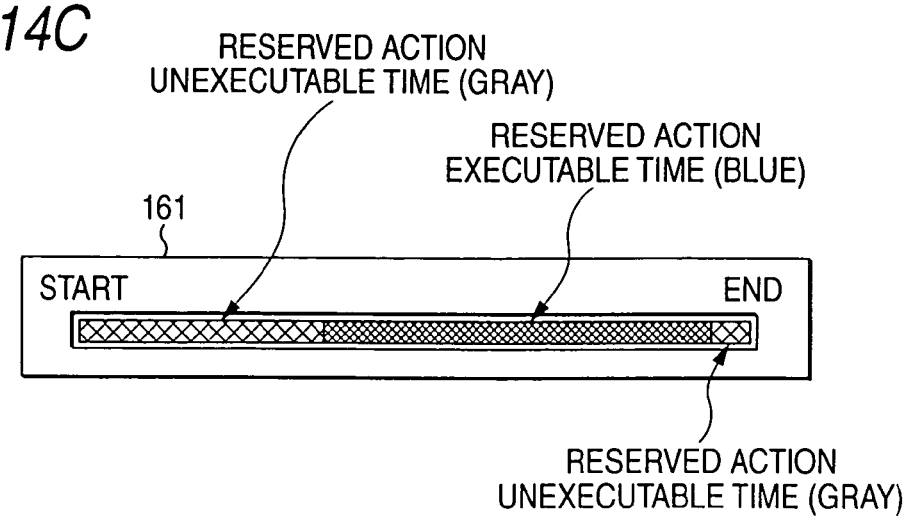
FIG. 14C shows a third display example of the reservation state indication region shown in FIG. 13.

FIGS. 14A-14C show other example of the discrimination information that is displayed in the reservation state indication region 161 of each reservation information when pieces of reservation information are displayed in list form.

As shown in FIGS. 14A-14C, an indicator that is colored differently in a reserved action execution time and in a reserved action non-execution time may be displayed in the reservation state indication region 161 in the case where the broadcast time of the program concerned overlaps with that of another program.

FIG. 14A shows an indicator example that is displayed in a case that an action corresponding to a reservation that is set for the program will be executed throughout its time slot. In this example, the reserved action execution (executable) time is indicated in blue. FIG. 14B shows an indicator example, to the contrary of FIG. 14A, that is displayed in a case that an action corresponding to a reservation that is set for the program will not be executed at all during its time slot. In this example, the reserved action non-execution (unexecutable) time is indicated in gray.

FIG. 14C shows an indicator example that is displayed in a case that an action corresponding to a reservation that is set for the program will be executed from a halfway point of its broadcast time and will not be executed in a short time slot immediately before the end.

The left end and the right end of each indicator corresponds to the start time and the end time of the program, respectively.

Figure 15A:
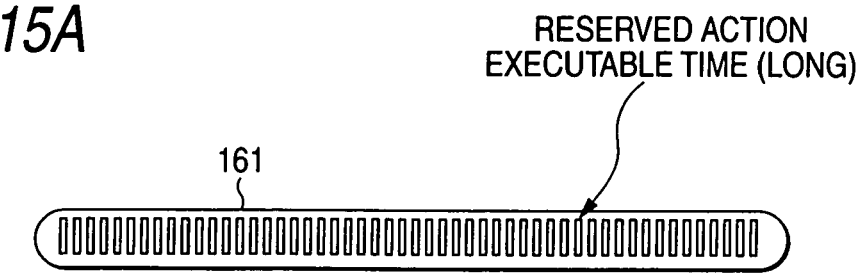
FIG. 15A shows a fourth display example of the reservation state indication region shown in FIG. 13.
Figure 15B:
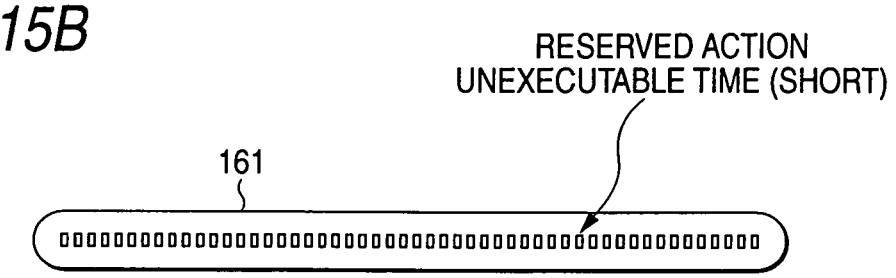
FIG. 15B shows a fifth display example of the reservation state indication region shown in FIG. 13.
Figure 15C:
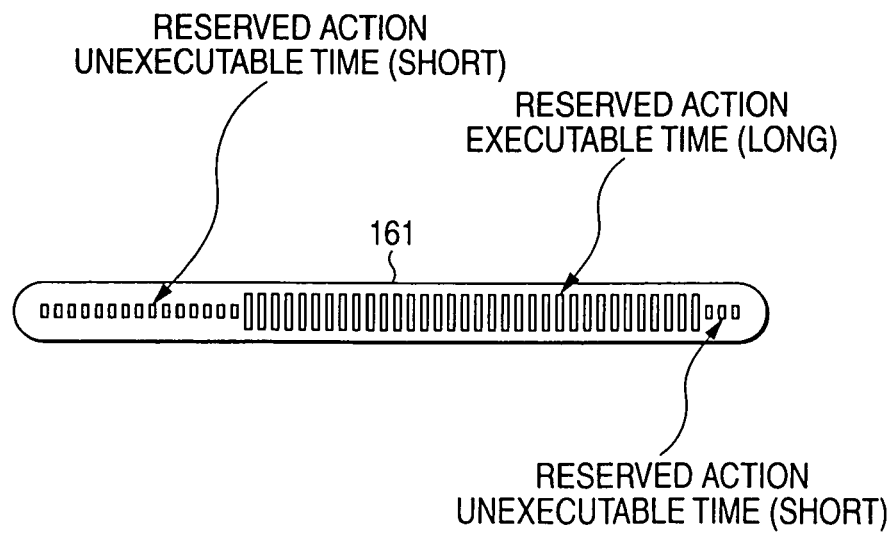
FIG. 15C shows a sixth display example of the reservation state indication region shown in FIG. 13.

FIGS. 15A-15C show other indicator examples that are displayed in the reservation state indication region 161.

In the examples of FIGS. 15A-15C, the size of the unit (bar) of the indicator is changed in a reserved action execution time and in a reserved action non-execution time. FIG. 15A shows an indicator that is displayed in a case that an action corresponding to a reservation that is set for the program will be executed throughout its time slot. FIG. 15B shows an indicator example that is displayed in a case that a reserved action will not be executed at all during its time slot.

That is, as shown in the figures, the unit of the indicator is longer in a time slot during which a reserved action will be executed than in a time slot during which the reserved action will not be executed.

Therefore, in this case, an indicator for a program a reserved action for which will be executed from a halfway point of its broadcast time and will not be executed in a short time slot immediately before the end is as shown in FIG. 15C.

Displaying the indicators shown in FIGS. 14A-14C and FIGS. 15A-15C allows the user to easily recognize visually settings of reserved actions to be executed for programs whose broadcast time slots overlap with each other.

FIG. 16 shows, in an enlarged manner, one piece of reservation information in the list display of FIG. 12. In this example, reservation information-11 is enlarged.

As shown in the figure, the reserved action execution time slot may be displayed simply in text form in the reservation state indication region 161. "Reserved action executable time 11:00 a.m. to 11:50 a.m." is displayed in the reservation state indication region 161 of the reservation information of FIG. 16.

FIG. 17 shows another example of the list display that allows the user to recognize a reservation state at a glance. The same mark is given to an overlap time slot.

More specifically, "11:50 a.m." that is the end time of program-11 and "11:30 a.m." that is the start time of program-14 are enclosed by color lines 171C and 172C, respectively. This kind of display also allows the user to recognize that program-11 and program-14 have an overlap time slot. For example, the color lines 171C and 172C may have the same color.

As described above, it is possible for various kinds of display to allow the user to recognize presence of broadcast time slots that overlap with each other.

For example, in the EPG 121 of FIG. 9 and the list display of FIG. 12, each overlap time slot and related icons may be blinked. Or an alarm message or an alarm sound may be output with prescribed timing, for example, immediately before an overlap time slot.

In this specification, steps of a program that is recorded in a recording medium may naturally be executed in time-series order, i.e., in written order. However, they may not necessarily be executed in time-series order; they may be executed in parallel or individually.

In this specification, the term "system" means the entire apparatus that is composed of a plurality of apparatuses and devices.

INDUSTRIAL APPLICABILITY

As described above, in a first display control apparatus and method of the invention, a recording reservation or a viewing reservation is set for a program, electronic program guide information is acquired, and the acquired electronic program guide information is displayed. Where a broadcast time slot of a program for which a recording reservation or a viewing reservation is set is overlaps with that of another program for which a recording reservation or a viewing reservation is set, the electronic program guide information is displayed in such a manner that an overlap first time slot is given prescribed discrimination information for discriminating the overlap first time slot from a non-overlap second time slot. Therefore, a user can easily recognize, for example, settings of reservations having an overlap execution-intended time slot.

In a second display control apparatus and method of the invention, a recording reservation or a viewing reservation is set for a program, and pieces of reservation information relating to recording reservations or viewing reservations that are set are displayed in list form. Where a broadcast time slot of a program for which a recording reservation or a viewing reservation is set by overlaps with that of another program for which a recording reservation or a viewing reservation is set, the pieces of reservation information are displayed in list form to which prescribed pieces of discrimination information indicating whether pieces of reservation information are effective in an overlap time slot are added. Therefore, a user can easily recognize, for example, settings of reservations having an overlap execution-intended time slot.

The invention claimed is:
1. A display control apparatus capable of setting a recording reservation or a viewing reservation for programs whose time slots overlap with each other, comprising:
  reservation setting means for setting a recording reservation and a viewing reservation for a program;

acquiring means for acquiring electronic program guide information;

display means for displaying the electronic program guide information acquired by the acquiring means;

priority rank setting means for setting a priority rank to the recording reservation or the viewing reservation that is set for each of the programs; and wherein a time slot of a program for which the recording reservation or the viewing reservation has been set by the reservation setting means overlaps with that of another program for which a recording reservation or a viewing reservation has been set, the display means displays the electronic program guide information in such a manner that the time slot of the program and that of the another program are each represented as a respective block relative to a common time axis, and wherein the time slot that is given a first pattern is a time slot during which an action corresponding to a reservation can be executed and the time slot given a first pattern does not overlap with the time slot of any other program, wherein the time slot that is given a second pattern is a time slot during which an action corresponding to a reservation can be executed because, although the time slot given a second pattern overlaps with the time slot of another program, a higher priority rank is set for the program than for the other program, and wherein the time slot that is given a third pattern is a time slot during which an action corresponding to a reservation cannot be executed because the time slot given a third pattern overlaps with the time slot of another program and a lower priority rank is set for the program than for the other program, and wherein the display means displays a list display comprising the reservation information including a program title, a broadcast channel, and information indicating a broadcast date and time, a reservation icon, information indicating a recording device to record the program, and information indicating whether the reservation currently set is effective or not.

2. The display control apparatus according to claim 1, wherein the display means displays the electronic program guide information in such a manner that the first time slot portion and the second time slot portion are given different colors.

3. A display control method of a display control apparatus capable of setting a recording reservation or a viewing reservation for programs whose time slots overlap with each other, the method comprising:

a reservation setting step of setting a recording reservation and a viewing reservation for a program;

an acquiring step of acquiring electronic program guide information;

a display step of displaying the electronic program guide information acquired by processing of the acquiring step; and setting a priority rank to the recording reservation or the viewing reservation that is set for each of the programs, wherein a time slot of a program for which a recording reservation or a viewing reservation has been set by processing of the reservation setting step overlaps with that of another program for which a recording reservation or a viewing reservation has been set, the electronic program guide information is displayed by processing of the display step in such a manner that the time slot of the program and that of another program are each represented as a respective block relative to a common time axis, wherein the time slot that is given a first pattern-1 is a time slot during which an action corresponding to a reservation can be executed because and the time slot given a first pattern does not overlap with the time slot of any other program, wherein the time slot that is given a second pattern is a time slot during which an action corresponding to a reservation can be executed because, although the time slot given a second pattern overlaps with the time slot of another program, a higher priority rank is set for the program than for the other program, and wherein the time slot that is given a third pattern is a time slot during which an action corresponding to a reservation cannot be executed because the time slot given a third pattern overlaps with the time slot of another program and a lower priority rank is set for the program than for the other program, wherein the display step displays a list display comprising the reservation information including a program title, a broadcast channel, and information indicating a broadcast date and time, a reservation icon, information indicating device to record the program, and information indicating whether the reservation currently set is effective or not.

4. A display control apparatus capable of setting a recording reservation or a viewing reservation for programs whose time slots overlap with each other, comprising:

reservation setting means for setting a recording reservation and a viewing reservation for a program; and display means for displaying, in a list form that is independent of a time axis common to a plurality of programs, pieces of reservation information relating to recording reservations or viewing reservations set by the reservation setting means; and priority rank setting means for setting a priority rank to the recording reservation or the viewing reservation that is set for each of the programs, wherein a time slot of a program for which a recording reservation or a viewing reservation has been set by the reservation setting means overlaps with that of another program for which a recording reservation or a viewing reservation has been set wherein the time slot that is given a first pattern-1 is a time slot during which an action corresponding to a reservation can be executed because and the time slot given a first pattern does not overlap with the time slot of any other program, wherein the time slot that is given a second pattern is a time slot during which an action corresponding to a reservation can be executed because, although the time slot given a second pattern overlaps with the time slot of another program, a higher priority rank is set for the program than for the other program, and wherein the time slot that is given a third pattern is a time slot during which an action corresponding to a reservation cannot be executed because the time slot given a third pattern overlaps with the time slot of another program and a lower priority rank is set for the program than for the other program, wherein the display means displays a list display comprising the reservation information including a program title, a broadcast channel, and information indicating a broadcast date and time, a reservation icon, info indicating a recording device to record the program, and information indicating whether the reservation currently set is effective or not.

5. The display control apparatus according to claim 4, wherein icons indicating whether the pieces of reservation information are effective in the overlap time slot are added as the pieces of discrimination information.

6. The display control apparatus according to claim 4, wherein indicators are added as the pieces of discrimination information, each of the indicators being such that of a time slot of the program a time slot during which an action corresponding to a recording reservation or a viewing reservation will be executed and a time slot during which the action corresponding to the recording reservation or the viewing reservation will not be executed are shown in different colors.

7. A display control method of a display control apparatus capable of setting a recording reservation or a viewing reservation for programs whose time slots overlap with each other, the method comprising:
   a reservation setting step of setting a recording reservation and a viewing reservation for a program; and
   a display step of displaying on an electronic program guide, in a list form that is independent of a time axis common to a plurality of programs, pieces of reservation information relating to recording reservations or viewing reservations set by processing of the reservation setting step; and
   a priority setting step for setting a priority rank to the recording reservation or the viewing reservation that is set for each of the programs,
   wherein a time slot of a program for which a recording reservation or a viewing reservation has been set by processing of the reservation setting step overlaps with that of another program for which a recording reservation or a viewing reservation has been set,
   wherein the time slot that is given a first pattern-1 is a time slot during which an action corresponding to a reservation can be executed because and the time slot given a first pattern does not overlap with the time slot of any other program,
   wherein the time slot that is given a second pattern is a time slot during which an action corresponding to a reservation can be executed because, although the time slot given a second pattern overlaps with the time slot of another program, a higher priority rank is set for the program than for the other program, and
   wherein the time slot that is given a third pattern is a time slot during which an action corresponding to a reservation cannot be executed because the time slot given a third pattern overlaps with the time slot of another program and a lower priority rank is set for the program than for the other program,
   wherein the display step displays a list display comprising the reservation information including a program title, a broadcast channel, and information indicating a broadcast date and time, a reservation icon, information indicating a recording device to record the program, and information indicating whether the reservation currently set is effective or not.

8. The display control method according to claim 3, wherein the displaying of the electronic program guide information comprises displaying the first time slot portion and the second time slot portion as different colors.

9. The display control apparatus according to claim 4, wherein the display means displays, in said list form, pieces of reservation information relating to recording reservations or viewing reservations for programs for which a recording reservation or a viewing reservation has been set by the reservation setting means, independent of whether the programs have overlapping time slots.

10. The display control apparatus according to claim 4, wherein each of the pieces of reservation information displayed by the display means corresponds to a respective program for which a recording reservation or a viewing reservation has been set.

11. The display control method according to claim 7, wherein icons indicating whether the pieces of reservation information are effective in the overlap time slot are added as the pieces of discrimination information.

12. The display control method according to claim 7, wherein indicators are added as the pieces of discrimination information, each of the indicators being such that of a time slot of the program a time slot during which an action corresponding to a recording reservation or a viewing reservation will be executed and a time slot during which the action corresponding to the recording reservation or the viewing reservation will not be executed are shown in different colors.

13. The display control method according to claim 7, wherein displaying, in said list form, pieces of reservation information relating to recording reservations or viewing reservations for programs for which a recording reservation or a viewing reservation has been set includes displaying a piece of reservation information for a first program that does not have an overlapping time slot with any other program for which a recording reservation or a viewing reservation has been set, together with a piece of reservation information for a second program that has an overlapping time slot with at least one other program for which a recording reservation or a viewing reservation has been set.

14. The display control method according to claim 7, wherein each of the pieces of reservation information corresponds to a respective program for which a recording reservation or a viewing reservation has been set.

15. A display control apparatus capable of setting a recording reservation or a viewing reservation for programs whose time slots overlap with each other, comprising:
   a reservation setting part configured to set a recording reservation and a viewing reservation for a program;
   an acquiring part configured to acquire electronic program guide information;
   a display part configured a priority rank setting to set a priority rank to the recording reservation or the viewing reservation that is set for each of the program and the other program,
   wherein when a time slot of a program for which a recording reservation or a viewing reservation has been set by the reservation setting part overlaps with that of another program for which a recording reservation or a viewing reservation has been set,
   wherein the time slot that is given a first pattern-1 is a time slot during which an action corresponding to a reservation can be executed because and the time slot given a first pattern does not overlap with the time slot of any other program,
   wherein the time slot that is given a second pattern is a time slot during which an action corresponding to a reservation can be executed because, although the time slot given a second pattern overlaps with the time slot of another program, a higher priority rank is set for the program than for the other program, and wherein the time slot that is given a third pattern is a time slot during which an action corresponding to a reservation cannot be executed because the time slot given a third pattern overlaps with the time slot of another program and a lower priority rank is set for the program than for the other program, wherein the display part displays a list display comprising the reservation information including a program title, a broadcast channel, and information indicating a broadcast date and time, a reservation con, information indicating a recording device to record the program, and information indicating whether the reservation currently set is effective of not.

\* \* \* \* \*